US010575225B2

(12) United States Patent
Lu et al.

(10) Patent No.: US 10,575,225 B2
(45) Date of Patent: Feb. 25, 2020

(54) INFORMATION CONFIGURATION METHOD AND DEVICE

(71) Applicant: Baicells Technologies Co. Ltd., Beijing (CN)

(72) Inventors: Yang Lu, Beijing (CN); Lixin Sun, Beijing (CN); Yingzhe Ding, Beijing (CN)

(73) Assignee: Baicells Technologies Co. Ltd., Beijing (CN)

( * ) Notice: Subject to any disclaimer, the term of this patent is extended or adjusted under 35 U.S.C. 154(b) by 0 days.

(21) Appl. No.: 16/094,761

(22) PCT Filed: Sep. 4, 2017

(86) PCT No.: PCT/CN2017/100311
§ 371 (c)(1),
(2) Date: Oct. 18, 2018

(87) PCT Pub. No.: WO2018/049995
PCT Pub. Date: Mar. 22, 2018

(65) Prior Publication Data
US 2019/0141588 A1    May 9, 2019

(30) Foreign Application Priority Data

Sep. 13, 2016   (CN) .......................... 2016 1 0823006

(51) Int. Cl.
*H04L 12/26*      (2006.01)
*H04J 3/06*       (2006.01)
(Continued)

(52) U.S. Cl.
CPC ....... *H04W 36/0083* (2013.01); *H04W 24/04* (2013.01); *H04W 24/10* (2013.01);
(Continued)

(58) Field of Classification Search
CPC ......... H04W 36/0083; H04W 36/0061; H04W 24/04; H04W 24/10; H04W 48/10; H04W 56/001
(Continued)

(56) References Cited

U.S. PATENT DOCUMENTS

2003/0117980 A1*  6/2003  Kim ................. H04W 36/0094
                                                  370/332
2015/0256319 A1*  9/2015  Lahetkangas ........ H04B 7/2656
                                                  370/280
(Continued)

FOREIGN PATENT DOCUMENTS

CN        101044697 A    9/2007
CN        101127998 A    2/2008
(Continued)

OTHER PUBLICATIONS

"Discussion on LAADRS design", 3GPP TSG RAN WG 1 Meeting #81, R1-152866, May 29, 2015, 8 pgs.
(Continued)

*Primary Examiner* — Thai D Hoang
(74) *Attorney, Agent, or Firm* — Kwan & Olynick LLP

(57) ABSTRACT

The present disclosure provides an information configuration method and an information configuration device. The information configuration method includes steps of: determining whether or not it is necessary to transmit DMTC information about synchronized neighboring cells and DMTC information about asynchronized neighboring cells to a UE; and in the case that it is necessary to transmit the DMTC information about the synchronized neighboring cells and the DMTC information about the asynchronized neighboring cells to the UE, transmitting first DMTC information about the neighboring cells to the UE, the first DMTC information about in the neighboring cells indicating the DMTC information about the synchronized neighboring (Continued)

receiving first DMTC information about a neighboring cells from a base station, the first DMTC information about the neighboring cells indicating DMTC information about synchronized neighboring cells and DMTC information about asynchronized neighboring cells — 201 acquiring the DMTC information about the synchronized neighboring cells and the DMTC information about the asynchronized neighboring cells in accordance with the first DMTC information about the neighboring cells — 202 performing channel measurement on the synchronized neighboring cells in accordance with the DMTC information about the synchronized neighboring cells, and performing channel measurement on the asynchronized neighboring cells in accordance with the DMTC information about the asynchronized neighboring cells — 203 cells and the DMTC information about the asynchronized neighboring cells to the UE.

18 Claims, 4 Drawing Sheets

(51) Int. Cl.
*H04W 36/00* (2009.01)
*H04W 48/10* (2009.01)
*H04W 24/04* (2009.01)
*H04W 56/00* (2009.01)
*H04W 24/10* (2009.01)
*H04W 48/20* (2009.01)

(52) U.S. Cl.
CPC ....... *H04W 36/0061* (2013.01); *H04W 48/10* (2013.01); *H04W 56/001* (2013.01); *H04W 48/20* (2013.01)

(58) Field of Classification Search
USPC .................................. 370/252, 503–519, 350
See application file for complete search history.

(56) References Cited

U.S. PATENT DOCUMENTS

| | | | | |
|---|---|---|---|---|
| 2016/0095074 A1* | 3/2016 | Park | ...................... | H04W 8/005 370/350 |
| 2016/0360463 A1* | 12/2016 | Kim | ...................... | H04B 7/0617 |
| 2017/0134146 A1* | 5/2017 | Chae | ...................... | H04L 5/0005 |
| 2017/0201898 A1 | 7/2017 | Park et al. | | |
| 2017/0223558 A1 | 8/2017 | Deng et al. | | |
| 2017/0264404 A1* | 9/2017 | Huang | .................. | H04L 5/0032 |
| 2017/0311230 A1 | 10/2017 | Yang et al. | | |
| 2017/0318490 A1 | 11/2017 | Yang et al. | | |
| 2018/0227832 A1* | 8/2018 | Da Silva | ............... | H04W 48/08 |

FOREIGN PATENT DOCUMENTS

| | | |
|---|---|---|
| CN | 101128000 A | 2/2008 |
| CN | 105307190 A | 2/2016 |
| CN | 105338566 A | 2/2016 |
| CN | 107820263 A | 3/2018 |
| EP | 2938134 A1 | 10/2015 |
| WO | 2015182915 A1 | 12/2015 |
| WO | 2016052911 A1 | 4/2016 |
| WO | 2016072765 A2 | 5/2016 |
| WO | 2018049995 A1 | 3/2018 |

OTHER PUBLICATIONS

"International Application Serial No. PCT/CN2017/100311, Search Report and Written Opinion dated Mar. 28, 2019", 19 pgs.
"Chinese Application Serial No. 2016108230068, Office Action dated Jul. 12, 2019", 9 pgs.
"Considerations of Measurement Issues in LAA", Huawei, HiSilicon, 3GPP TSG-RAN WG2 Meeting #91, Aug. 2015, 4 pgs.
"Considerations on RRM Measurements for LAA-LTE", Qualcomm Incorporated, 3GPP TSG-RAN WG2 Meeting #90bis, May 2015, 6 pgs.
"Discovery and RRM procedure for LAA", Qualcomm Incorporated, 3GPP TSG RAN WG1 #83, Nov. 2015, 5 pgs.
"Japanese Application Serial No. 2018-540032, Office Action dated May 31, 2019", 6 pgs.
"Remaining Details of Subframe Types", Qualcomm Incorporated, 3GPP TSG RAN WG1 #83, Nov. 2015, 4 pgs.
"Korean Application Serial No. 10-2018-7023254, Office Action dated Sep. 26, 2019", 5 pgs.

* cited by examiner

```
┌─────────────────────────────────────────────────────────────┐
│  determining whether or not it is necessary to transmit DMTC │  101
│  information about synchronized neighboring cells and DMTC   │/
│  information about asynchronized neighboring cells to a UE   │
└─────────────────────────────────────────────────────────────┘
                              │
                              ▼
┌─────────────────────────────────────────────────────────────┐
│   in the case that it is necessary to transmit the DMTC      │
│   information about the synchronized neighboring cells and   │
│ the DMTC information about the asynchronized neighboring     │  102
│ cells to the UE, transmitting first DMTC information         │/
│   about the neighboring cells to the UE, the first DMTC      │
│   information about the neighboring cells indicating the     │
│   DMTC information about the synchronized neighboring cells  │
│   and the DMTC information about the asynchronized neighboring│
│                       cells to the UE                        │
└─────────────────────────────────────────────────────────────┘
```

Fig.1

```
┌─────────────────────────────────────────────────────────────┐
│ receiving first DMTC information about a neighboring cells   │
│ from a base station, the first DMTC information about the    │  201
│ neighboring cells indicating DMTC information about          │/
│ synchronized neighboring cells and DMTC information about    │
│ asynchronized neighboring cells                              │
└─────────────────────────────────────────────────────────────┘
                              │
                              ▼
┌─────────────────────────────────────────────────────────────┐
│ acquiring the DMTC information about the synchronized        │
│ neighboring cells and the DMTC information about the         │  202
│ asynchronized neighboring cells in accordance with the       │/
│ first DMTC information about the neighboring cells           │
└─────────────────────────────────────────────────────────────┘
                              │
                              ▼
┌─────────────────────────────────────────────────────────────┐
│ performing channel measurement on the synchronized           │
│    neighboring cells in accordance with the DMTC             │
│    information about the synchronized neighboring cells,     │  203
│    and performing channel measurement on the                 │/
│    asynchronized neighboring cells in accordance with the    │
│    DMTC information about the asynchronized neighboring cells│
└─────────────────────────────────────────────────────────────┘
```

Fig.2

INFORMATION CONFIGURATION METHOD AND DEVICE

CROSS-REFERENCE TO RELATED APPLICATION

The present application is the U.S. national phase of PCT Application No. PCT/CN2017/100311 filed on Sep. 4, 2017, which claims a priority of the Chinese patent application No. 201610823006.8 filed before the SIPO on Sep. 13, 2016, both of which are incorporated herein by reference in entirety and for all purposes.

TECHNICAL FIELD

The present disclosure relates to the field of communication technology, in particular to an information configuration method and an information configuration device.

BACKGROUND

MulteFire (MF) is a wireless access technology for extending a Long Term Evolution (LTE) system to an unlicensed frequency band, and it is able to use this technology individually in an unlicensed spectrum without the aid of carriers at a licensed frequency band. In order to enable the other devices operated at the unlicensed frequency band (e.g., a Wireless Fidelity (WiFi) device) to fairly occupy a channel at the unlicensed frequency band and prevent these devices from interference with each other, a Listen Before Table (LBT) mechanism, similar to a WiFi carrier monitoring technology, has been introduced into an MF physical layer. In the case that the channel at the unlicensed frequency band has been occupied, i.e., the LBT mechanism is failed, a base station or a User Equipment (UE) may stop to transmit a signal. The base station or UE may transmit the signal only in the case that the channel is in an idle state, i.e., the LBT mechanism is succeeded.

In order to improve the transmission efficiency of a downlink common control signal from the base station under the LBT mechanism, a Discovery Reference Signal (DRS) has been introduced into MulteFire. The DRS contains the principal downlink common control signals, including system broadcast, Primary Synchronization Signal (PSS), Secondary Synchronization Signal (SSS), enhanced Primary Synchronization Signal (ePSS), enhanced Secondary Synchronization Signal (eSSS), Cell Reference Signal (CRS), Master Information Block (MIB), and System Information Block MulteFire (SIB-MF). Twelve or fourteen symbols within a downlink subframe are occupied by the DRS.

The UE may receive the DRS within a Discovery Signals Measurement Timing Configuration (DMTC) window, so as to perform downlink synchronization, and receive the MIB and SIB-MF. An MF cell may merely transmit the CSR within a DRS subframe or any other subframe where a Physical Downlink Shared Channel (PDSCH) is transmitted. Hence, the UE may merely perform channel measurement on an MF serving cell or an MF neighboring cell within the DMTC window, so as to perform cell selection, cell reselection or cell handover.

In the related art, in the case of transmitting DMTC information about the MF neighboring cells, the base station may merely transmit the DMTC information about the MF neighboring cells synchronized with the base station, or the DMTC information about the MF neighboring cells asynchronized with the base station. In the case that the UE needs to measure channel quality of the synchronized neighboring cells and the asynchronized neighboring cells, it is impossible for the UE to acquire the DMTC information about the synchronized neighboring cells and the asynchronized neighboring cells simultaneously, and at this time, the service transmission may be adversely affected.

SUMMARY

An object of the present disclosure is to provide an information configuration method and an information configuration device, so as to solve the problem in the related art where the service transmission is adversely affected in the case that the UE cannot acquire simultaneously the DMTC information about the synchronized neighboring cells and the asynchronized neighboring cells and the channel quality of the synchronized neighboring cells and the asynchronized neighboring cells cannot be measured simultaneously.

In one aspect, the present disclosure provides in some embodiments an information configuration method, including steps of: determining whether or not it is necessary to transmit DMTC information about synchronized neighboring cells and DMTC information about asynchronized neighboring cells to a UE; and in the case that it is necessary to transmit the DMTC information about the synchronized neighboring cells and the DMTC information about the asynchronized neighboring cells to the UE, transmitting first DMTC information about the neighboring cells to the UE, the first DMTC information about the neighboring cells indicating the DMTC information about the synchronized neighboring cells and the DMTC information about the asynchronized neighboring cells to the UE. The first DMTC information about the neighboring cells includes a first synchronization identifier and a first DMTC parameter. The first DMTC parameter includes one or more of a duration of a DMTC window of the synchronized neighboring cells, a periodicity of the DMTC window of the synchronized neighboring cells, and a subframe offset of the synchronized neighboring cells.

In another aspect, the present disclosure provides in some embodiments an information configuration method, including steps of: receiving first DMTC information about the neighboring cells from a base station, the first DMTC information about the neighboring cells indicating DMTC information about synchronized neighboring cells and DMTC information about asynchronized neighboring cells; acquiring the DMTC information about the synchronized neighboring cells and the DMTC information about the asynchronized neighboring cells in accordance with the first DMTC information about the neighboring cells: and performing channel measurement on the synchronized neighboring cells in accordance with the DMTC information about the synchronized neighboring cells, and performing channel measurement on the asynchronized neighboring cells in accordance with the DMTC information about the asynchronized neighboring cells. The first DMTC information about the neighboring cells includes a first synchronization identifier and a first DMTC parameter. The first DMTC parameter includes one or more of a duration of a DMTC window of the synchronized neighboring cells, a periodicity of the DMTC window of the synchronized neighboring cells, and a subframe offset of the synchronized neighboring cells.

In yet another aspect, the present disclosure provides in some embodiments an information configuration device, including: a determination module configured to determine whether or not it is necessary to transmit DMTC information about synchronized neighboring cells and DMTC information about asynchronized neighboring cells to a UE; and a first information transmission module configured to, in the case that it is necessary to transmit the DMTC information about the synchronized neighboring cells and the DMTC information about the asynchronized neighboring cells to the UE, transmit first DMTC information about the neighboring cells to the UE, the first DMTC information about the neighboring cells indicating the DMTC information about the synchronized neighboring cells and the DMTC information about the asynchronized neighboring cells to the UE. The first DMTC information about the neighboring cells includes a first synchronization identifier and a first DMTC parameter. The first DMTC parameter includes one or more of a duration of a DMTC window of the synchronized neighboring cells, a periodicity of the DMTC window of the synchronized neighboring cells, and a subframe offset of the synchronized neighboring cells.

In still yet another aspect, the present disclosure provides in some embodiments an information configuration device, including: a first information reception module configured to receive first DMTC information about the neighboring cells from a base station, the first DMTC information about the neighboring cells indicating DMTC information about synchronized neighboring cells and DMTC information about asynchronized neighboring cells; an information acquisition module configured to acquire the DMTC information about the synchronized neighboring cells and the DMTC information about the asynchronized neighboring cells in accordance with the first DMTC information about the neighboring cells; and a channel measurement module configured to perform channel measurement on the synchronized neighboring cells in accordance with the DMTC information about the synchronized neighboring cells, and perform channel measurement on the asynchronized neighboring cells in accordance with the DMTC information about the asynchronized neighboring cells. The first DMTC information about the neighboring cells includes a first synchronization identifier and a first DMTC parameter. The first DMTC parameter includes one or more of a duration of a DMTC window of the synchronized neighboring cells, a periodicity of the DMTC window of the synchronized neighboring cells, and a subframe offset of the synchronized neighboring cells.

In still yet another aspect, the present disclosure provides in some embodiments an information configuration device, including a processor, a memory in and a transmitter. The processor is configured to call and execute programs or data stored in the memory, so as to determine whether or not it is necessary to transmit DMTC information about synchronized neighboring cells and DMTC information about asynchronized neighboring cells to a UE. The transmitter is configured to, in the case that it is necessary to transmit the DMTC information about the synchronized neighboring cells and the DMTC information about the asynchronized neighboring cells to the UE, transmit first DMTC information about the neighboring cells to the UE, the first DMTC information about the neighboring cells indicating the DMTC information about the synchronized neighboring cells and the DMTC information about the asynchronized neighboring cells to the UE. The first DMTC information about the neighboring cells includes a first synchronization identifier and a first DMTC parameter. The first DMTC parameter includes one or more of a duration of a DMTC window of the synchronized neighboring cells, a periodicity of the DMTC window of the synchronized neighboring cells, and a subframe offset of the synchronized neighboring cells.

In still yet another aspect, the present disclosure provides in some embodiments an information configuration device, including a processor, a memory and a receiver. The receiver is configured to receive first DMTC information about the neighboring cells from a base station, the first DMTC information about the neighboring cells indicating DMTC information about synchronized neighboring cells and DMTC information about asynchronized neighboring cells. The processor is configured to call and execute programs or data stored in the memory, so as to acquire the DMTC information about the synchronized neighboring cells and the DMTC information about the asynchronized neighboring cells in accordance with the first DMTC information about the neighboring cells received by the receiver, perform channel measurement on the synchronized neighboring cells in accordance with the DMTC information about the synchronized neighboring cells, and perform channel measurement on the asynchronized neighboring cells in accordance with the DMTC information about the asynchronized neighboring cells. The first DMTC information about the neighboring cells includes a first synchronization identifier and a first DMTC parameter. The first DMTC parameter includes one or more of a duration of a DMTC window of the synchronized neighboring cells, a periodicity of the DMTC window of the synchronized neighboring cells, and a subframe offset of the synchronized neighboring cells.

In still yet another aspect, the present disclosure provides in some embodiments a computer-readable storage medium storing thereon instructions so as to: determine whether or not it is necessary to transmit DMTC information about synchronized neighboring cells and DMTC information about asynchronized neighboring cells to a UE; and in the case that it is necessary to transmit the DMTC information about the synchronized neighboring cells and the DMTC information about the asynchronized neighboring cells to the UE, transmit first DMTC information about the neighboring cells to the UE, the first DMTC information about the neighboring cells indicating the DMTC information about the synchronized neighboring cells and the DMTC information about the asynchronized neighboring cells to the UE. The first DMTC information about the neighboring cells includes a first synchronization identifier and a first DMTC parameter. The first DMTC parameter includes one or more of a duration of a DMTC window of the synchronized neighboring cells, a periodicity of the DMTC window of the synchronized neighboring cells, and a subframe offset of the synchronized neighboring cells.

In still yet another aspect, the present disclosure provides in some embodiments a computer-readable storage medium storing thereon instructions so as to: receive first DMTC information about the neighboring cells from a base station, the first DMTC information about the neighboring cells indicating DMTC information about synchronized neighboring cells and DMTC information about asynchronized neighboring cells: acquire the DMTC information about the synchronized neighboring cells and the DMTC information about the asynchronized neighboring cells in accordance with the first DMTC information about the neighboring cells: and perform channel measurement on the synchronized neighboring cells in accordance with the DMTC information about the synchronized neighboring cells, and perform channel measurement on the asynchronized neighboring cells in accordance with the DMTC information about the asynchronized neighboring cells. The first DMTC information about the neighboring cells includes a first synchronization identifier and a first DMTC parameter. The first DMTC parameter includes one or more of a duration of a DMTC window of the synchronized neighboring cells, a periodicity of the DMTC window of the synchronized neighboring cells, and a subframe offset of the synchronized neighboring cells.

According to the embodiments of the present disclosure, in the case that it is necessary for the UE to acquire the DMTC information about the synchronized neighboring cells and the asynchronized neighboring cells simultaneously, the first DMTC information about the neighboring cells indicates the DMTC information about the synchronized neighboring cells and the asynchronized neighboring cells to the UE. As a result, it is able for the UE to perform the channel measurement on the synchronized neighboring cells and the asynchronized neighboring cells simultaneously, thereby to ensure the service transmission.

BRIEF DESCRIPTION OF THE DRAWINGS

FIG. 1 is a flow chart of an information configuration method according to a first embodiment of the present disclosure:

FIG. 2 is a flow chart of an information configuration method according to a second embodiment of the present disclosure;

DETAILED DESCRIPTION OF THE EMBODIMENTS

Figure 3:
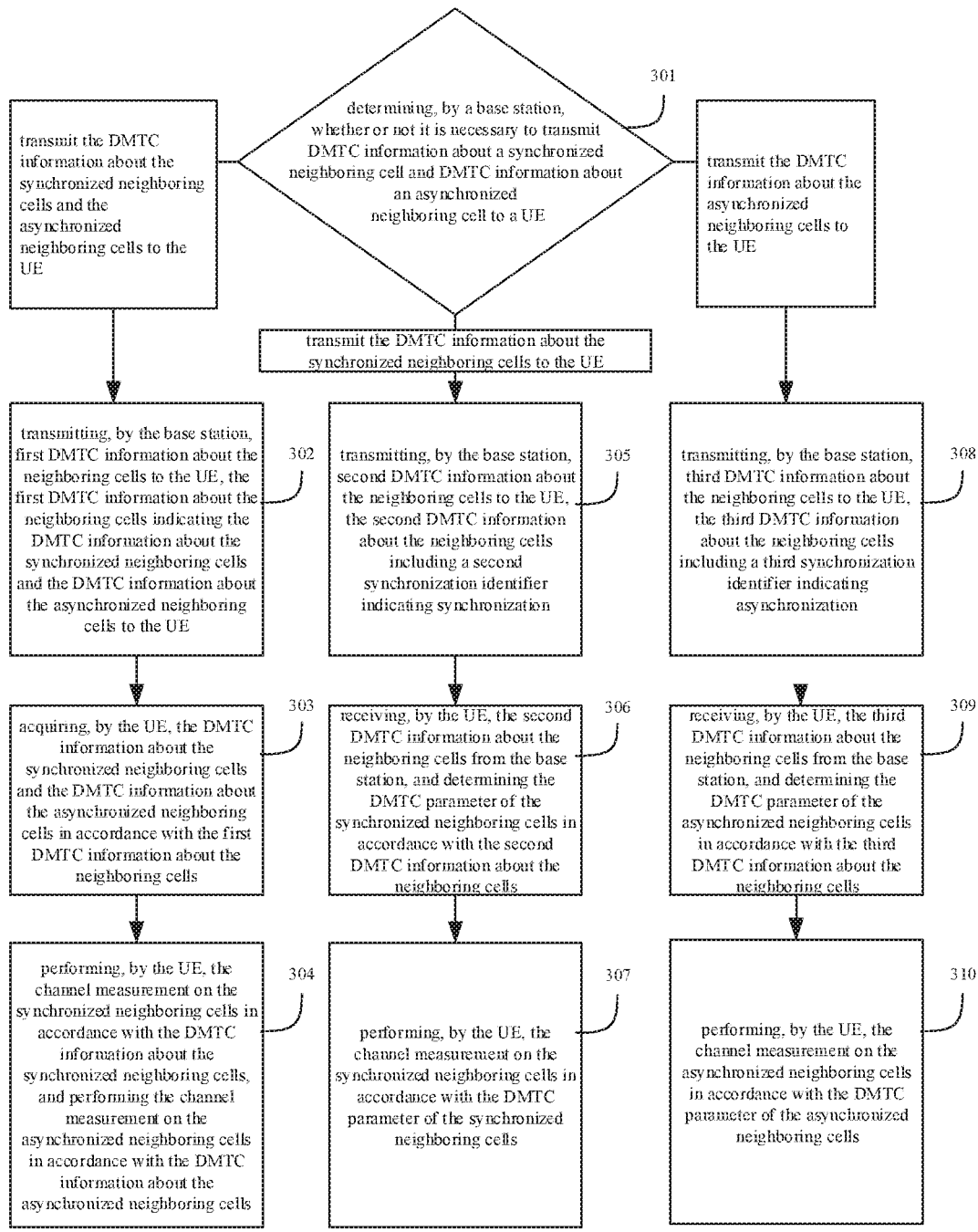
FIG. 3 is a flow chart of an information configuration method according to a third embodiment of the present disclosure.

The present disclosure will be described hereinafter in conjunction with the drawings and embodiments. The following embodiments are for illustrative purposes only, but shall not be used to limit the scope of the present disclosure.

In actual use, a base station may transmit DMTC information about a serving cell, intra-frequency neighboring cells and inter-frequency neighboring cells to a UE, broadcast DMTC information about a current MF serving cell via SIB-MF, broadcast DMTC information about intra-frequency neighboring cells via SIB3 or transmit the DMTC information about the intra-frequency MF neighboring cells via a UE-specific Radio Resource Control (RRC) message, and broadcast DMTC information about an inter-frequency MF neighboring cells at a designated frequency point via SIB5 or transmit the DMTC information about the inter-frequency MF neighboring cells at the designated frequency point via the UE-specific RRC message. In this way, the UE may acquire measurement time windows of the MF serving cell, the intra-frequency MF neighboring cells and the inter-frequency MF neighboring cells in accordance with the DMTC information for the subsequent channel measurement. The DMTC information about the MF serving cell includes a DMTC parameter, and the DMTC parameter includes a duration of the DMTC window (dmtc-duration), a periodicity of the DMTC window (dmtc-periodicity) and a subframe offset of the DMTC window (dmtc-Offset). The dmtc-periodicity is 40 ms, 80 ms or 160 ms, and the dmtc-Offset is 0 to 159.

The UE may determine a position of the DMTC window for the MF serving cell using the following equations in accordance with the DMTC information about the MFM serving cell, so as to merely perform the channel measurement on the MF serving cell within the DMTC window: an initial DMTC frame number mod T=FLOOR(dmtc-Offset/10), an initial DMTC subframe number-dmtc-Offset mod 10, and T=dmtc-periodicity/10.

In the case that an offset of a frame timing of the MF neighboring cells relative to that of a serving cell does not exceed 2 ms or a subframe timing of the MF neighboring cells is synchronized with that of the serving cell, the MF neighboring cells is synchronized with the serving cell. Otherwise, the MF neighboring cells is asynchronized with the serving cell. The offset of the frame timing of the MF neighboring cells relative to the serving cell refers to a time difference between an initial time point of a radio frame of the MF neighboring cells and an initial time point of a radio frame of the serving cell with an identical frame number. The base station may know the subframe offset of the DMTC window of the synchronized MF neighboring cells, and may not know the subframe offset of the DMTC window of the asynchronized MF neighboring cells.

In the case of transmitting the DMTC information about the MF neighboring cells, the base station is capable of merely transmitting the DMTC information about the MF neighboring cells synchronized with the base station or the DMTC information about the MF neighboring cells asynchronized with the base station, rather than both of them. In the case that it is necessary for the UE to perform the channel quality measurement on the synchronized MF neighboring cells and the asynchronized neighboring cells simultaneously, it is impossible for the base station to transmit the DMTC information about the synchronized MF neighboring cells and the asynchronized MF neighboring cells to the UE. In this regard, the present disclosure provides in some embodiments an information configuration method so as to enable the UE to acquire the DMTC information about the synchronized MF neighboring cells and the DMTC information about the asynchronized MF neighboring cells simultaneously. The present disclosure will be described hereinafter in conjunction with the drawings and embodiments.

First Embodiment

As shown in FIG. 1, the present disclosure provides in this embodiment an information configuration method for a base station, which includes the following steps.

Step 101: determining whether or not it is necessary to transmit DMTC information about synchronized neighboring cells and DMTC information about asynchronized neighboring cells to a UE.

In actual use, the base station may determine whether or not a neighboring cells is the synchronized or asynchronized neighboring cells and determine the DMTC information about the neighboring cells via Operations, Administration and Maintenance (OAM) configuration. In a possible embodiment of the present disclosure, the base station may also acquire whether or not the neighboring cells is the synchronized or asynchronized neighboring cells and acquire the DMTC information about the neighboring cells from an adjacent base station through a network selfconfiguration function, or in accordance with a UE measurement report message. In another possible embodiment of the present disclosure, the base station may directly monitor a broadcast message from the neighboring cells, so as to acquire whether or not the neighboring cells is the synchronized or asynchronized neighboring cells and acquire the DMTC information about the neighboring cells.

Step 102: in the case that it is necessary to transmit the DMTC information about the synchronized neighboring cells and the DMTC information about the asynchronized neighboring cells to the UE, transmitting first DMTC information about the neighboring cells to the UE, the first DMTC information about the neighboring cells indicating the DMTC information about the synchronized neighboring cells and the DMTC information about the asynchronized neighboring cells to the UE.

The first DMTC information about the neighboring cells includes a first synchronization identifier and a first DMTC parameter. The first DMTC parameter includes one or more of a duration of a DMTC window of the synchronized neighboring cells (dmtc-duration), a periodicity of the DMTC window of the synchronized neighboring cells (dmtc-periodicity), and a subframe offset of the synchronized neighboring cells (dmtc-Offset).

It can be therefore seen that, in the embodiments of the present disclosure, in the case that it is necessary for the UE to acquire the DMTC information about the synchronized neighboring cells and the asynchronized neighboring cells simultaneously, the first DMTC information about the neighboring cells indicates the DMTC information about the synchronized neighboring cells and the asynchronized neighboring cells to the UE. As a result, it is able for the UE to perform the channel measurement on the synchronized neighboring cells and the asynchronized neighboring cells simultaneously, thereby to ensure the service transmission.

Second Embodiment

As shown in FIG. 2, the present disclosure provides in this embodiment an information configuration method for a UE, which includes the following steps.

Step 201: receiving first DMTC information about the neighboring cells from a base station, the first DMTC information about the neighboring cells indicating DMTC information about synchronized neighboring cells and DMTC information about asynchronized neighboring cells.

To be specific, the base station may transmit the first DMTC information about intra-frequency neighboring cells via a SIB3 broadcast message or a UE-specific RRC message (e.g., a measurement configuration message), and transmit the first DMTC information about inter-frequency neighboring cells at a designated frequency point via a SIB5 broadcast message or the UE-specific RRC message (e.g., the measurement configuration message).

In this step, correspondingly, the UE may receive the first DMTC information about the neighboring cells of the intra-frequency neighboring cells via the SIB3 broadcast message or the UE-specific RRC message, and receive the first DMTC information about the neighboring cells of the inter-frequency neighboring cells at the designated frequency point via the SIB5 broadcast message or the UE-specific RRC message.

The first DMTC information about the neighboring cells includes a first synchronization identifier and a first DMTC parameter. The first DMTC parameter includes one or more of a duration of a DMTC window of the synchronized neighboring cells, a periodicity of the DMTC window of the synchronized neighboring cells, and a subframe offset of the synchronized neighboring cells.

Step 202: acquiring the DMTC information about the synchronized neighboring cells and the DMTC information about the asynchronized neighboring cells in accordance with the first DMTC information about the neighboring cells.

To be specific, in this step, in the case that the first synchronization identifier indicates asynchronization, the UE may acquire the DMTC information about the synchronized neighboring cells and the DMTC information about the asynchronized neighboring cells in accordance with the first DMTC information about the neighboring cells.

In a possible embodiment of the present disclosure, in this step, in the case that the first DMTC parameter further includes a second DMTC parameter, the UE may acquire the DMTC information about the synchronized neighboring cells and the DMTC information about the asynchronized neighboring cells in accordance with the first DMTC information about the neighboring cells. The second DMTC parameter includes one or more of a duration of a DMTC window of the asynchronized neighboring cells, a periodicity of the DMTC window of the asynchronized neighboring cells, and a subframe offset of the inter-frequency neighboring cells.

Step 203: performing channel measurement on the synchronized neighboring cells in accordance with the DMTC information about the synchronized neighboring cells, and performing channel measurement on the asynchronized neighboring cells in accordance with the DMTC information about the asynchronized neighboring cells.

It can be therefore seen that, in the embodiments of the present disclosure, in the case that it is necessary for the UE to acquire the DMTC information about the synchronized neighboring cells and the asynchronized neighboring cells simultaneously, the first DMTC information about the neighboring cells indicates the DMTC information about the synchronized neighboring cells and the asynchronized neighboring cells to the UE. As a result, it is able for the UE to perform the channel measurement on the synchronized neighboring cells and the in asynchronized neighboring cells simultaneously, thereby to ensure the service transmission.

Third Embodiment

As shown in FIG. 3, the present disclosure provides in this embodiment an information configuration method which includes the following steps.

Step 301: determining, by a base station, whether or not it is necessary to transmit DMTC information about synchronized neighboring cells and DMTC information about asynchronized neighboring cells to a UE.

Detailed description about this step may refer to that about Step 101 in the first embodiment.

In the case that it is necessary to transmit the DMTC information about the synchronized neighboring cells and the DMTC information about the asynchronized neighboring cells to the UE, Steps 302 to 304 may be executed; in the case that it is merely necessary to transmit the DMTC information about the synchronized neighboring cells to the UE, Steps 305 to 307 may be executed; and in the case that it is merely necessary to transmit the DMTC information about the asynchronized neighboring cells to the UE, Steps 308 to 310 may be executed.

Step 302: in the case that it is necessary to transmit the DMTC information about the synchronized neighboring cells and the DMTC information about the asynchronized neighboring cells to the UE, transmitting, by the base station, first DMTC information about the neighboring cells to the UE, the first DMTC information about the neighboring cells indicating the DMTC information about the synchronized neighboring cells and the DMTC information about the asynchronized neighboring cells to the UE.

The first DMTC information about the neighboring cells includes a first synchronization identifier and a first DMTC parameter. The first DMTC parameter includes one or more of a duration of a DMTC window of the synchronized neighboring cells, a periodicity of the DMTC window of the synchronized neighboring cells, and a subframe offset of the synchronized neighboring cells.

In a possible embodiment of the present disclosure, the first DMTC information about the neighboring cells may further include a second DMTC parameter. The second DMTC parameter includes one or more of a duration of a DMTC window of the asynchronized neighboring cells, a periodicity of the DMTC window of the asynchronized neighboring cells, and a subframe offset of the inter-frequency neighboring cells.

In the embodiments of the present disclosure, the DMTC information about the synchronized neighboring cells and the DMTC information about the asynchronized neighboring cells may be indicated to the UE in various modes.

Mode 1: the first synchronization identifier indicates asynchronization.

In this mode, the base station may not indicate a DMTC parameter of the asynchronized neighboring cells to the UE, and instead, the base station may indicate the UE to measure the channel quality of the asynchronized neighboring cells via the first synchronization identifier which indicates the asynchronization state.

In this mode, the first synchronization identifier may be an explicit or implicit identifier. To be specific, the base station may indicate the UE to measure the channel quality of the asynchronized neighboring cells via the first synchronization identifier in an explicit manner, or via an encoding structure of the RRC in an implicit manner. For example, in actual use, the base station may indicate the UE to measure the channel quality of the asynchronized neighboring cells via an encoding structure of the second DMTC parameter. However, at this time, the encoding structure does not include any second DMTC parameter.

The UE may acquire the DMTC parameter of the synchronized neighboring cells in accordance with the first DMTC parameter, and determine the DMTC parameter of the asynchronized neighboring cells as a designated value. This designated value may be a default value agreed by the UE and the base station in advance, or any random value selected by the UE itself.

Mode 2: the first DMTC information about the neighboring cells may include, apart from the first DMTC parameter, the second DMTC parameter.

In this mode, the base station may indicate the DMTC parameter of the asynchronized neighboring cells to the UE via the second DMTC parameter.

The first synchronization identifier may be an explicit or implicit identifier. To be specific, the base station may indicate the UE to measure the channel quality of the asynchronized neighboring cells via the first synchronization identifier in an explicit manner, or via the encoding structure of the RRC in an implicit manner. For example, in actual use, the base station may indicate the UE to measure the channel quality of the asynchronized neighboring cells via the encoding structure of the second DMTC parameter.

The UE may acquire the DMTC parameter of the synchronized neighboring cells in accordance with the first DMTC parameter, and acquire the DMTC parameter of the asynchronized neighboring cells in accordance with the second DMTC parameter.

In the embodiments of the present disclosure, the base station may indicate the DMTC information about the synchronized neighboring cells to the UE in various modes.

Mode 1: the first DMTC information about the neighboring cells from the base station may further include first indication information. The first indication information indicates the UE to use a periodicity of a DMTC window of a serving cell as the periodicity of the DMTC window of the synchronized neighboring cells, and/or indicate the UE to use a duration of the DMTC window of the serving cell as the duration of the DMTC window of the synchronized neighboring cells.

For example, in the case that the first DMTC parameter merely includes the subframe offset of the DMTC window of the synchronized neighboring cells, the base station may, via the first indication information, indicate the UE to use the periodicity of the DMTC window of the serving cell as the periodicity of the DMTC window of the synchronized neighboring cells, and/or indicate the UE to use the duration of the DMTC window of the serving cell as the duration of the DMTC window of the synchronized neighboring cells.

The first indication information may be explicit or implicit indication information.

Mode 2: the first DMTC information about the neighboring cells from the base station may further include second indication information. The second indication information indicates that the periodicity and/or the duration of the DMTC window of the synchronized neighboring cells are designated values.

The second indication information may be explicit or implicit indication information. Each designated value may be a default value agreed by the UE and the base station in advance, or any random value selected by the UE itself.

Step 303: acquiring, by the UE, the DMTC information about the synchronized neighboring cells and the DMTC information about the asynchronized neighboring cells in accordance with the first DMTC information about the neighboring cells.

In this step, the UE may at first determine whether or not the first synchronization identifier indicates the asynchronization state. In the case that the first synchronization identifier indicates the asynchronization state, the UE may acquire the DMTC information about the synchronized neighboring cells and the DMTC information about the asynchronized neighboring cells in accordance with the first DMTC information about the neighboring cells.

The first synchronization identifier may be an explicit or implicit identifier. To be specific, the UE may determine that it is necessary to measure the channel quality of the asynchronized neighboring cells via the first synchronization identifier (which indicates the asynchronization state) in an explicit manner, or via an encoding structure of the RRC in an implicit manner. For example, in the actual use, the UE may determine that it is necessary to measure the channel quality of the asynchronized neighboring cells via an encoding structure including the second DMTC parameter.

In a possible embodiment of the present disclosure, the UE may at first determine whether or not the first DMTC information about the neighboring cells further includes the second DMTC parameter. In the case that the first DMTC information about the neighboring cells further includes the second DMTC parameter, the UE may acquire the DMTC information about the synchronized neighboring cells and the DMTC information about the asynchronous neighboring cells in accordance with the first DMTC information about the neighboring cells.

To be specific, in Step 303, the UE may determine the DMTC information about the synchronized neighboring cells in the following modes.

Mode 1: the UE may determine the periodicity of the DMTC window of the serving cell as the periodicity of the DMTC window of the synchronized neighboring cells and/or determine the duration of the DMTC window of the serving cell as the duration of the DMTC window of the synchronized neighboring cells.

To be specific, in this mode, the UE may, via indication information from the base station, determine the periodicity of the DMTC window of the serving cell as the periodicity of the DMTC window of the synchronized neighboring cells and/or determine the duration of the DMTC window of the serving cell as the duration of the DMTC window of the synchronized neighboring cells. At this time, the UE may acquire first indication information in the first DMTC information about the neighboring cells, and use the periodicity of the DMTC window of the serving cell as the periodicity of the DMTC window of the synchronized neighboring cells and/or use the duration of the DMTC window of the serving cell as the duration of the DMTC window of the synchronized neighboring cells in accordance with the first indication information.

In a possible embodiment of the present disclosure, in this mode, the UE may further make an agreement with the base station in advance, so as to determine the periodicity of the DMTC window of the serving cell as the periodicity of the DMTC window of the synchronized neighboring cells and/or determine the duration of the DMTC window of the serving cell as the duration of the DMTC window of the synchronized neighboring cells.

Mode 2: the UE may determine the periodicity and/or the duration of the DMTC window of the synchronized neighboring cells as designated values.

In this mode, the UE may determine the periodicity and/or the duration of the DMTC window of the synchronized neighboring cells as designated values in accordance with indication information from the base station. To be specific, the UE in may acquire second indication information in the first DMTC information about the neighboring cells, and determine the periodicity and/or the duration of the DMTC window of the synchronized neighboring cells as designated values in accordance with the second indication information.

The second indication information may be explicit or implicit indication information. Each designated value may be a default value agreed by the base station and the UE in advance.

In a possible embodiment of the present disclosure, the UE itself may determine the periodicity and/or the duration of the DMTC window of the synchronized neighboring cells as designated values. For example, the UE may determine the periodicity of the DMTC window of the synchronized neighboring cells as a designated periodicity (e.g., a minimum periodicity 40 ms of the DMTC window), or determine the duration of the DMTC window of the synchronized neighboring cells as a designated duration (e.g., a maximum duration of the DMTC window, i.e., 10 ms).

In a word, the subframe offset of the DMTC window in the first DMTC parameter may serve as the subframe offset of the DMTC window of the synchronized neighboring cells. In the case that the first DMTC parameter includes any one of the duration and the periodicity of the DMTC window of the synchronized neighboring cells, a parameter included in the first DMTC parameter may serve as the parameter used for the channel measurement. Otherwise, the DMTC parameter of the serving cell may serve as the DMTC parameter of the synchronized neighboring cells, or the DMTC parameter of the synchronized neighboring cells not included in the first DMTC parameter may be determined as the designated value.

To be specific, in Step 303, the UE may determine the DMTC information about the asynchronized neighboring cells in the following modes.

Corresponding to Mode 1 in Step 302, the UE may determine the periodicity of the DMTC window of the asynchronized neighboring cells as a designated periodicity or as a sum of the designated periodicity and a designated offset, and/or determine the duration of the DMTC window of the asynchronized neighboring cells as a designated duration.

For example, the UE may determine the periodicity of the DMTC window of the asynchronized neighboring cells as a designated periodicity (e.g., a minimum periodicity 40 ms of the DMTC window) or determine the duration of the DMTC window of the asynchronized neighboring cells as a designated duration (e.g., a maximum duration 10 ms of the DMTC window). In a possible embodiment of the present disclosure, the UE may determine the periodicity of the DMTC window of the asynchronized neighboring cells as a sum of the designated periodicity and a designated offset, and the designated offset is the designated duration minus 2 or 1. For example, in the case that the designated periodicity is 40 ms and the designated duration is 10 ms, the periodicity of the DMTC window of the asynchronized neighboring cells may be 48 ms (40+(10-2)) or 49 ms (40+(10-1)).

Corresponding to Mode 2 in Step 302, the UE may determine the DMTC information about the asynchronized neighboring cells in the following mode.

The UE may determine the periodicity of the DMTC window of the asynchronized neighboring cells as the periodicity of the DMTC window included in the second DMTC parameter or a sum of the periodicity of the DMTC window included in the second DMTC parameter and the designated offset, and/or determine the duration of the DMTC window of the asynchronized neighboring cells as the designated duration, and/or determine the subframe offset of the DMTC window of the asynchronized neighboring cells as the designated subframe offset.

Here, in the case that the second DMTC parameter includes any one of the duration and the periodicity of the DMTC window of the asynchronized neighboring cells and the subframe offset of the DMTC window of the asynchronized neighboring cells, the parameter included in the second DMTC parameter may be used as the parameter for the channel measurement. Otherwise, the parameter not included in the second DMTC parameter may be determined as the designated value. In the case that the second DMTC parameter includes the periodicity of the DMTC window of the asynchronized neighboring cells, apart from the value included in the second DMTC parameter, a sum of the periodicity of the DMTC window included in in the second DMTC parameter and the designated offset may also be used as the periodicity of the DMTC window of the asynchronized neighboring cells for the channel measurement.

Step 304: performing, by the UE, the channel measurement on the synchronized neighboring cells in accordance with the DMTC information about the synchronized neighboring cells, and performing the channel measurement on the asynchronized neighboring cells in accordance with the DMTC information about the asynchronized neighboring cells.

Step 305: transmitting, by the base station, second DMTC information about the neighboring cells to the UE, the second DMTC information about the neighboring cells including a second synchronization identifier indicating synchronization.

Here, the second synchronization identifier may be an explicit or implicit identifier. To be specific, the base station may indicate the UE to merely measure the channel quality of the synchronized neighboring cells via the second synchronization identifier (which indicates the synchronization state) in an explicit manner, or indicate the UE to merely measure the channel quality of the synchronized neighboring cells via the encoding structure of the RRC. For example, in actual use, the base station may indicate the UE to merely measure the channel quality of the synchronized neighboring cells via an encoding structure including a third DMTC parameter rather than a fourth DMTC parameter.

In this step, the second DMTC information about the neighboring cells further includes third indication information. The third indication information indicates the UE to use a DMTC parameter of a serving cell as the DMTC parameter of the synchronized neighboring cells, or indicate that one or more of the duration and the periodicity of the DMTC window of the synchronized neighboring cells and the subframe offset of the synchronized neighboring cells is a designated value. The DMTC parameter of the serving cell includes a duration and a periodicity of a DMTC window of the serving cell, and a subframe offset of the serving cell.

Each designated value may be a default value agreed by the base station in and the UE in advance, or determined by the UE itself. The third indication information may be explicit or implicit indication information.

The second DMTC information about the neighboring cells may further include a third DMTC parameter at least including the subframe offset of the DMTC window of the synchronized neighboring cells.

At this time, the second DMTC information about the neighboring cells may further include fourth indication information. The fourth indication information indicates the UE to use the duration of the DMTC window of the serving cell as the duration of the DMTC window of the synchronized neighboring cells, and/or indicate the UE to use the periodicity of the DMTC window of the serving cell as the periodicity of the DMTC window of the synchronized neighboring cells. In a possible embodiment of the present disclosure, the second DMTC information about the neighboring cells may further include fifth indication information. The fifth indication information indicates that one or two of the duration and the periodicity of the DMTC window of the synchronized neighboring cells is a designated value. Each designated value may be a default value agreed by the base station and the UE in advance, or determined by the UE itself. Each of the fourth indication information and the fifth indication information may be explicit or implicit indication information. The UE may acquire the DMTC parameter of the synchronized neighboring cells in accordance with the third DMTC parameter.

Step 306: receiving, by the UE, the second DMTC information about the neighboring cells from the base station, and determining the DMTC parameter of the synchronized neighboring cells in accordance with the second DMTC information about the neighboring cells.

In this step, in the case that the second DMTC information about the neighboring cells merely includes the second synchronization identifier and the second synchronization identifier indicates the synchronization state, the UE may determine the DMTC parameter of the serving cell as the DMTC parameter of the synchronized neighboring cells, and/or determine one or more of the duration and the in periodicity of the DMTC window of the synchronized neighboring cells and the subframe offset of the synchronized neighboring cells as the designated values.

The UE may, in accordance with indication information from the base station, determine the DMTC parameter of the serving cell as the second DMTC parameter of the synchronized neighboring cells, and/or determine the value(s) of one or more of the duration and the periodicity of the DMTC window of the synchronized neighboring cells and the subframe offset of the synchronized neighboring cells. To be specific, the UE may acquire the third indication information included in the second DMTC information about the neighboring cells and determine the DMTC parameter of the serving cell as the second DMTC parameter of the synchronized neighboring cells in accordance with the third indication information, and/or determine one or more of the duration and the periodicity of the DMTC window of the synchronized neighboring cells and the subframe offset of the synchronized neighboring cells as the designated values. Each designated value may make an agreement with the base station in advance, so as to determine the DMTC parameter of the serving cell as the DMTC parameter of the synchronized neighboring cells, and/or determine one or more of the duration and the periodicity of the DMTC window of the synchronized neighboring cells and the subframe offset of the synchronized neighboring cells as the designated values.

In the case that the second DMTC information about the neighboring cells further includes the third DMTC parameter, the third DMTC parameter may at least include the subframe offset of the DMTC window of the synchronized neighboring cells. At this time, the UE may determine the duration of the DMTC window of the serving cell as the duration of the DMTC window of the synchronized neighboring cells, and/or use the periodicity of the DMTC window of the serving cell as the periodicity of the DMTC window of the synchronized neighboring cells. The UE may, in accordance with the indication information from the base station, use the duration of the DMTC window of the serving cell as the duration of the DMTC window of the synchronized neighboring cells, and/or use the periodicity of the DMTC window of the serving cell as the periodicity of the DMTC window of the in synchronized neighboring cells. To be specific, the UE may acquire the fourth indication information included in the second DMTC information about the neighboring cells, and use the duration of the DMTC window of the serving cell as the duration of the DMTC window of the synchronized neighboring cells in accordance with the fourth indication information, and/or use the periodicity of the DMTC window of the serving cell as the periodicity of the DMTC window of the synchronized neighboring cells. In a possible embodiment of the present disclosure, the UE may further make an agreement with the base station in advance, so as to use the duration of the DMTC window of the serving cell as the duration of the DMTC window of the synchronized neighboring cells, and/or use the periodicity of the DMTC window of the serving cell as the periodicity of the DMTC window of the synchronized neighboring cells.

In the case that the second DMTC information about the neighboring cells further includes the third DMTC parameter, the third DMTC parameter may at least include the subframe offset of the DMTC window of the synchronized neighboring cells. The UE may further determine one or two of the duration and the periodicity of the DMTMC window of the synchronized neighboring cells as the designated values.

The UE may, in accordance with the indication information from the base station, determine one or two of the duration and the periodicity of the DMTC window of the synchronized neighboring cells as the designated values. To be specific, the UE may acquire the fifth indication information included in the second DMTC information about the neighboring cells, and determine the designated value(s) of one or two of the duration and the periodicity of the DMTC window of the synchronized neighboring cells in accordance with the fifth indication information. Each designated value may be indicated by the base station to the UE, or determined by the UE itself. In a possible embodiment of the present disclosure, the UE may further make an agreement with the base station in advance, so as to determine the designated values of one or two of the duration and the periodicity of the DMTC window of the synchronized neighboring cells. For example, the UE may determine the duration of the DMTC window of the synchronized neighboring cells as the designated periodicity (e.g., a minimum periodicity 40 ms of the DMTC window), or determine the duration of the DMTC window of the synchronized neighboring cells as the designated duration (e.g., a maximum duration 10 ms of the DMTC window).

In a word, the subframe offset of the DMTC window in the third DMTC parameter may serve as the subframe offset of the DMTC window of the synchronized neighboring cells. In the case that the third DMTC parameter includes any one of the duration and the periodicity of the DMTC window of the synchronized neighboring cells, a parameter included in the third DMTC parameter may serve as the parameter used for the channel measurement. Otherwise, the DMTC parameter of the serving cell may serve as the DMTC parameter of the synchronized neighboring cells, or the DMTC parameter of the synchronized neighboring cells not included in the third DMTC parameter may be determined as the designated value.

Step 307: performing, by the UE, the channel measurement on the synchronized neighboring cells in accordance with the DMTC parameter of the synchronized neighboring cells.

Here, the UE may perform the channel measurement on the synchronized neighboring cells in accordance with the DMTC parameter of the synchronized neighboring cells acquired in Step 306.

Step 308: transmitting, by the base station, third DMTC information about the neighboring cells to the UE, the third DMTC information about the neighboring cells including a third synchronization identifier indicating asynchronization.

The third synchronization identifier may be explicit or implicit identifier. To be specific, the base station may indicate the UE to merely measure the channel quality of the asynchronized neighboring cells via the third synchronization identifier (which indicates the asynchronization state) in an explicit manner, or via the encoding structure of the RRC in an implicit manner. For example, in actual use, the base station may indicate the UE merely to measure the channel quality of the asynchronized neighboring cells via the encoding structure including a fourth DMTC parameter rather than the third DMTC parameter.

In addition, the third DMTC information about the neighboring cells further includes the fourth DMTC parameter. The fourth DMTC parameter includes one or more of the duration of the DMTC window of the asynchronized neighboring cells and the subframe offset of the DMTC window of the asynchronized neighboring cells. The UE may acquire the DMTC parameter of the asynchronized neighboring cells in accordance with the fourth DMTC parameter.

Step 309: receiving, by the UE, the third DMTC information about the neighboring cells from the base station, and determining the DMTC parameter of the asynchronized neighboring cells in accordance with the third DMTC information about the neighboring cells.

To be specific, in this step, in the case that the third DMTC information about the neighboring cells merely includes the third synchronization identifier, the UE may determine the periodicity of the DMTC window of the asynchronized neighboring cells as a designated periodicity or a sum of the designated periodicity and a designated offset, and/or determine the duration of the DMTC window of the asynchronized neighboring cells as a designated duration.

For example, in the case that the third DMTC information about the neighboring cells does not include the periodicity or duration of the DMTC window of the asynchronized neighboring cells, the UE may determine the periodicity of the DMTC window of the asynchronized neighboring cells as the designated periodicity (e.g., a minimum periodicity 40 ms of the DMTC window) or determine the duration of the DMTC window of the asynchronized neighboring cells as the designated duration (e.g., a maximum duration 10 ms of the DMTC window). In a possible embodiment of the present disclosure, the UE may determine the periodicity of the DMTC window of the asynchronized neighboring cells as the sum of the designated periodicity and the designated offset, and the designated offset is the designated duration minus 2 or 1. For example, in the case that the designated periodicity is 40 ms and the designated duration is 10 ms, the periodicity of the DMTC window of the asynchronized neighboring cells may be 48 ms (40+(10-2)) or 49 ms (40+(10-1)).

In addition, the third DMTC information about the neighboring cells further includes the fourth DMTC parameter. The fourth DMTC parameter includes one or more of the duration and the periodicity of the DMTC window of the asynchronized neighboring cells and the subframe offset of the DMTC window of the asynchronized neighboring cells.

At this time, the UE may determine the periodicity of the DMTC window of the asynchronized neighboring cells as the periodicity of the DMTC window included in the fourth DMTC parameter or the sum of the periodicity of the DMTC window included in the fourth DMTC parameter and the designated offset, and/or determine the duration of the DMTC window of the asynchronized neighboring cells as the designated duration, and/or determine the subframe offset of the DMTC window of the asynchronized neighboring cells as the designated subframe offset.

In other words, in the case that the fourth DMTC parameter includes any one of the duration and the periodicity of the DMTC window of the asynchronized neighboring cells and the subframe offset of the DMTC window of the asynchronized neighboring cells, the parameter included in the fourth DMTC parameter may serve as the parameter for the channel measurement. Otherwise, the parameter not included in the fourth DMTC parameter may be determined as the designated value. In the case that the fourth DMTC parameter includes the periodicity of the DMTC window of the asynchronized neighboring cells, apart from the value included in the fourth DMTC parameter, the sum of the periodicity of the DMTC window included in the fourth DMTC parameter and the designated offset may also serve as the periodicity of the DMTC window of the asynchronized neighboring cells for the channel measurement.

Step 310: performing, by the UE, the channel measurement on the asynchronized neighboring cells in accordance with the DMTC parameter of the asynchronized neighboring cells.

In this embodiment, the UE may acquire the DMTC information about the neighboring cells of the intra-frequency neighboring cells via the SIB3 broadcast message or the UE-specific RRC message, or acquire the DMTC information about the neighboring cells of the inter-frequency neighboring cells at a designated frequency point via the SIB5 broadcast message or the UE-specific RRC message.

It can be therefore seen that, according to the embodiment of the present disclosure, in the case that it is necessary for the UE to acquire the DMTC information about the synchronized neighboring cells and the asynchronized neighboring cells simultaneously, the first DMTC information about the neighboring cells indicates the DMTC information about the synchronized neighboring cells and the asynchronized neighboring cells to the UE. As a result, it is able for the UE to perform the channel measurement on the synchronized neighboring cells and the asynchronized neighboring cells simultaneously, thereby to ensure the service transmission.

Fourth Embodiment

Figure 4:
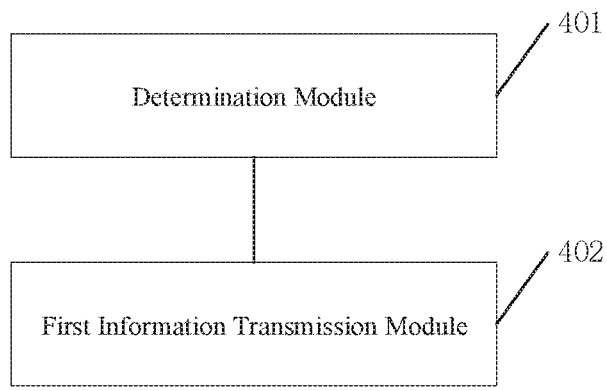
FIG. 4 is a schematic view showing an information configuration device according to a fourth embodiment of the present disclosure.

As shown in FIG. 4, the present disclosure provides in this embodiment an information configuration device, which includes: a determination module 401 configured to determine whether or not it is necessary to transmit DMTC information about synchronized neighboring cells and DMTC information about asynchronized neighboring cells to a UE: and a first information transmission module 402 configured to, in the case that it is necessary to transmit the DMTC information about the synchronized neighboring cells and the DMTC information about the asynchronized neighboring cells to the UE, transmit first DMTC information about the neighboring cells to the UE, the first DMTC information about the neighboring cells indicating the DMTC information about the synchronized neighboring cells and the DMTC information about the asynchronized neighboring cells to the UE. The first DMTC information about the neighboring cells includes a first synchronization identifier and a first DMTC parameter. The first DMTC parameter includes one or more of a duration of a DMTC window of the synchronized neighboring cells, a periodicity of the DMTC window of the synchronized neighboring cells, and a subframe offset of the synchronized neighboring cells.

In actual use, the first synchronization identifier indicates asynchronization. In a possible embodiment of the present disclosure, the first synchronization identifier indicates a synchronization or asynchronization state. The first DMTC information about the neighboring cells further includes a second DMTC parameter. The second DMTC parameter includes one or more of a duration of a DMTC window of the asynchronized neighboring cells, a periodicity of the DMTC window of the asynchronized neighboring cells, and a subframe offset of the inter-frequency neighboring cells.

The first information transmission module 402 is further configured to transmit the first DMTC information about the neighboring cells of the intra-frequency neighboring cells via the SIB3 broadcast message or the UE-specific RRC message, and transmit the first DMTC information about the neighboring cells of the inter-frequency neighboring cells at a designated frequency point via the SIB5 broadcast message or the UE-specific RRC message.

The first DMTC information about the neighboring cells may further include first indication information. The first indication information indicates the UE to use a periodicity of a DMTC window of a serving cell as the periodicity of the DMTC window of the synchronized neighboring cells, and/or indicate the UE to use a duration of the DMTC window of the serving cell as the duration of the DMTC window of the synchronized neighboring cells.

The first DMTC information about the neighboring cells may further include second indication information. The second indication information indicates that the periodicity and/or the duration of the DMTC window of the synchronized neighboring cells are designated values.

Figure 5:
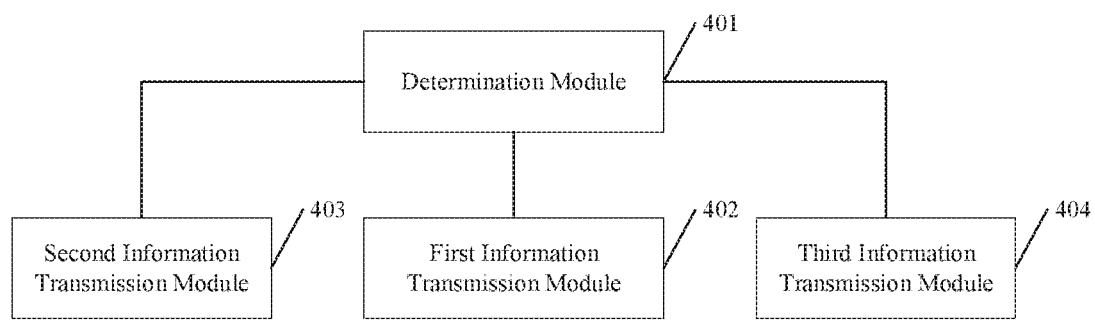
FIG. 5 is another schematic view showing the information configuration device according to the fourth embodiment of the present disclosure.

As shown in FIG. 5, the information configuration device further includes a second information transmission module 403 configured to, in the case that it is merely necessary to transmit the DMTC information about the synchronized neighboring cells to the UE, transmit second DMTC information about the neighboring cells to the UE. The second DMTC information about the neighboring cells includes a second synchronization identifier indicating synchronization.

The second DMTC information about the neighboring cells may further include third indication information. The third indication information indicates the UE to use a DMTC parameter of the serving cell as the DMTC parameter of the synchronized neighboring cells, or indicate that one or more of the duration and the periodicity of the DMTC window of the synchronized neighboring cells and the subframe offset of the synchronized neighboring cells is a designated value. The DMTC parameter of the serving cell includes one or more of a duration and a periodicity of a DMTC window of the serving cell, and a subframe offset of the serving cell.

The second DMTC information about the neighboring cells may further include a third DMTC parameter, and the third DMTC parameter at least includes the subframe offset of the DMTC window of the synchronized neighboring cells. The second DMTC information about the neighboring cells may further include fourth indication information. The fourth indication information indicates the UE to use the duration of the DMTC window of the serving cell as the duration of the DMTC window of the synchronized neighboring cells, and/or indicate the UE to use the periodicity of the DMTC window of the serving cell as the periodicity of the DMTC window of the synchronized neighboring cells. In a possible embodiment of the present disclosure, the second DMTC information about the neighboring cells may further include fifth indication information. The fifth indication information indicates that one or two of the duration and the periodicity of the DMTC window of the synchronized neighboring cells is a designated value.

As shown in FIG. 5, the information configuration device may further include a third information transmission module 404 configured to transmit third DMTC information about the neighboring cells to the UE. The third DMTC information about the neighboring cells includes a third synchronization identifier indicating the asynchronization state.

The third DMTC information about the neighboring cells may further include a fourth DMTC parameter. The fourth DMTC parameter includes one or more of the duration, the periodicity and the subframe offset of the DMTC window of the asynchronized neighboring cells.

The information configuration device in this embodiment may be located within a base station, and an operating principle of the information configuration device may refer to that mentioned hereinabove.

It can be therefore seen that, according to the embodiment of the present disclosure, in the case that it is necessary for the UE to acquire the DMTC information about the synchronized neighboring cells and the asynchronized neighboring cells simultaneously, the first DMTC information about the neighboring cells indicates the DMTC information about the synchronized neighboring cells and the asynchronized neighboring cells to the UE. As a result, it is able for the UE to perform the channel measurement on the synchronized neighboring cells and the asynchronized neighboring cells simultaneously, thereby to ensure the service transmission.

Fifth Embodiment

Figure 6:
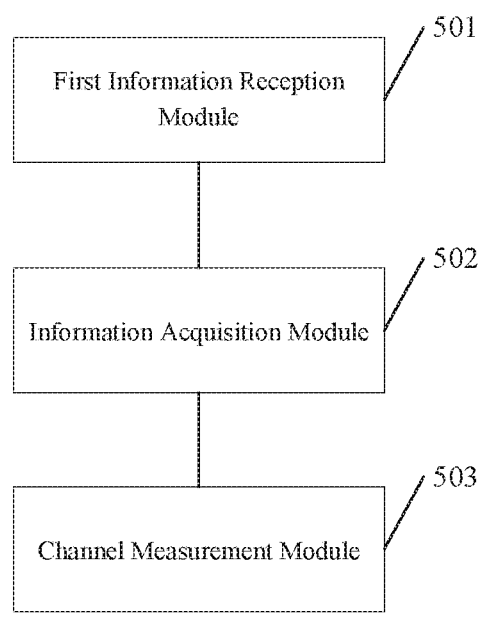
FIG. 6 is a schematic view showing an information configuration device according to a fifth embodiment of the present disclosure.

As shown in FIG. 6, the present disclosure provides in this embodiment an information configuration device, which includes: a first information reception module 501 configured to receive first DMTC information about the neighboring cells from a base station, the first DMTC information about the neighboring cells indicating DMTC information about synchronized neighboring cells and DMTC information about asynchronized neighboring cells; an information acquisition module 502 configured to acquire the DMTC information about the synchronized neighboring cells and the DMTC information about the asynchronized neighboring cells in accordance with the first DMTC information about the neighboring cells; and a channel measurement module 503 configured to perform channel measurement on the synchronized neighboring cells in accordance with the DMTC information about the synchronized neighboring cells, and perform channel measurement on the asynchronized neighboring cells in accordance with the DMTC information about the asynchronized neighboring cells. The first DMTC information about the neighboring cells includes a first synchronization identifier and a first DMTC parameter. The first DMTC parameter includes one or more of a duration of a DMTC window of the synchronized neighboring cells, a periodicity of the DMTC window of the in synchronized neighboring cells, and a subframe offset of the synchronized neighboring cells.

To be specific, the first information reception module 501 is further configured to receive the first DMTC information about the neighboring cells of the intra-frequency neighboring cells via the SIB3 broadcast message or the UE-specific RRC message, and receive the first DMTC information about the neighboring cells of the inter-frequency neighboring cells at a designated frequency point via the SIB5 broadcast message or the UE-specific RRC message.

To be specific, the information acquisition module 502 is further configured to, in the case that the first synchronization identifier indicates asynchronization, acquire the DMTC information about the synchronized neighboring cells and the DMTC information about the asynchronized neighboring cells in accordance with the first DMTC information about the neighboring cells.

To be specific, the information acquisition module 502 is further configured to, in the case that the first DMTC parameter further includes a second DMTC parameter, acquire the DMTC information about the synchronized neighboring cells and the DMTC information about the asynchronized neighboring cells in accordance with the first DMTC information about the neighboring cells. The second DMTC parameter includes one or more of the duration and the periodicity of the DMTC window of the asynchronized neighboring cells and the subframe offset of the DMTC window of the asynchronized neighboring cells.

In actual use, the information acquisition module 502 is further configured to, in the case of acquiring the DMTC information about the synchronized neighboring cells, determine the periodicity of the DMTC window of the serving cell as the periodicity of the DMTC window of the synchronized neighboring cells and/or use the duration of the DMTC window of the serving cell as the duration of the DMTC window of the synchronized neighboring cells in accordance with first indication information included in the first DMTC information about the neighboring cells.

In actual use, the information acquisition module 502 is further in configured to, in the case of acquiring the DMTC information about the synchronized neighboring cells, determine the periodicity and/or the duration of the DMTC window of the synchronized neighboring cells as designated values in accordance with second indication information included in the first DMTC information about the neighboring cells.

In actual use, the information acquisition module 502 is further configured to, in the case of acquiring the DMTC information about the asynchronized neighboring cells, determine the periodicity of the DMTC window of the asynchronized neighboring cells as a designated periodicity or as a sum of the designated periodicity and a designated offset, and/or determine the duration of the DMTC window of the asynchronized neighboring cells as a designated duration, and/or determine the subframe offset of the DMTC window of the asynchronized neighboring cells as a designated subframe offset.

In actual use, the information acquisition module 502 is further configured to, in the case of acquiring the DMTC information about the asynchronized neighboring cells, determine the periodicity of the DMTC window of the asynchronized neighboring cells as the periodicity of the DMTC window of the second DMTC parameter, or a sum of the DMTC window included in the second DMTC parameter and a designated offset.

Figure 7:
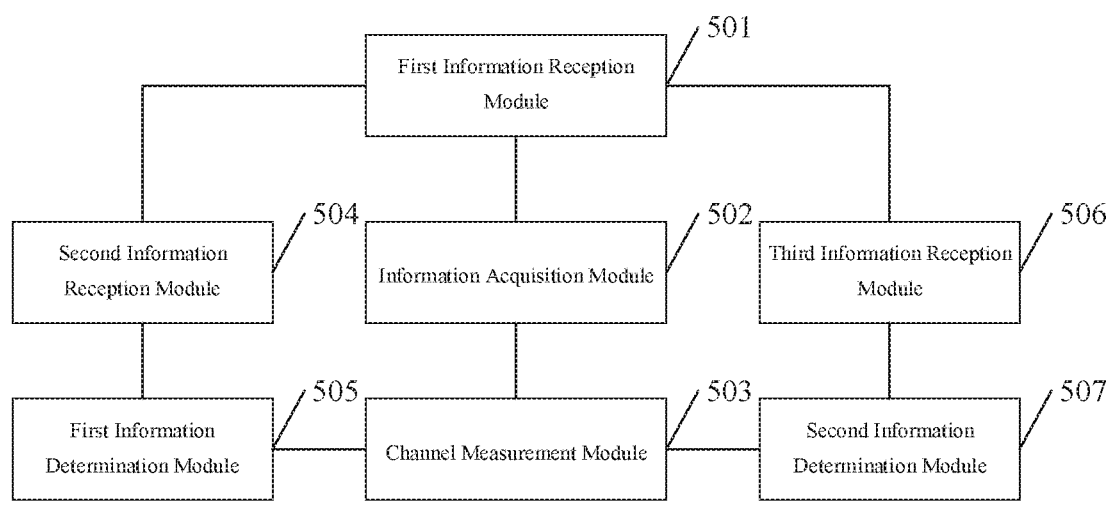
FIG. 7 is another schematic view showing the information configuration in device according to the fifth embodiment of the present disclosure.

As shown in FIG. 7, the information configuration device further includes: a second information reception module 504 configured to receive second DMTC information about the neighboring cells from the base station, the second DMTC information about the neighboring cells including a second synchronization identifier indicating synchronization: and a first information determination module 505 configured to determine the DMTC parameter of the synchronized neighboring cells in accordance with the second DMTC information about the neighboring cells. The channel measurement module 503 is further configured to perform the channel measurement on the synchronized neighboring cells in accordance with the DMTC parameter of the synchronized neighboring cells.

The first information determination module 505 is further configured to determine the DMTC parameter of the serving cell as the DMTC parameter of the synchronized neighboring cells in accordance with third information included in the second DMTC information about the neighboring cells, or determine one or more of the duration and the periodicity of the DMTC window of the synchronized neighboring cells and the subframe offset of the synchronized neighboring cells as a designated value. The DMTC parameter of the serving cell includes the duration and the periodicity of the DMTC window of the serving cell and the subframe offset of the serving cell.

The second DMTC information about the neighboring cells further includes a third DMTC parameter, and the third DMTC parameter at least includes the subframe offset of the DMTC window of the synchronized neighboring cells.

To be specific, the first information determination module 505 is further configured to use the duration of the DMTC window of the serving cell as the duration of the DMTC window of the synchronized neighboring cells, and/or use the periodicity of the DMTC window of the serving cell as the periodicity of the DMTC window of the synchronized neighboring cells in accordance with fourth indication information included in the second DMTC information about the neighboring cells.

To be specific, the first information determination module 505 is further configured to determine one or two of the duration and the periodicity of the DMTC window of the synchronized neighboring cells as a designated value in accordance with fifth indication information included in the second DMTC information about the neighboring cells.

As shown in FIG. 7, the information configuration device further includes: a third information reception module 506 configured to receive third DMTC information about the neighboring cells from the base station, the third DMTC information about the neighboring cells including a third synchronization identifier indicating asynchronization; and a second information determination module 507 configured to determine the DMTC parameter of the asynchronized neighboring cells in accordance with the third DMTC information about the neighboring cells. The channel measurement module 503 is further configured to perform the channel measurement on the asynchronized neighboring cells in accordance with the DMTC parameter of the asynchronized neighboring cells.

In addition, the third DMTC information about the neighboring cells further includes a fourth DMTC parameter. The fourth DMTC parameter includes one or more of the duration, the periodicity and the subframe offset of the DMTC window of the asynchronized neighboring cells.

The second information determination module 507 is further configured to determine the periodicity of the DMTC window of the asynchronized neighboring cells as a designated periodicity or a sum of the designated periodicity and a designated offset, and/or determine the duration of the DMTC window of the asynchronized neighboring cells as a designated duration, and/or determine the subframe offset of the DMTC window of the asynchronized neighboring cells as a designated subframe offset.

The second information determination module is further configured to determine the periodicity of the DMTC window of the asynchronized neighboring cells as the periodicity of the DMTC window included in the fourth DMTC parameter, or a sum of the periodicity of the DMTC window included in the fourth DMTC parameter and the designated offset.

The information configuration device in this embodiment may be located within a UE, and an operating principle thereof may refer to that mentioned above.

It can be therefore seen that, according to the embodiment of the present disclosure, in the case that it is necessary for the UE to acquire the DMTC information about the synchronized neighboring cells and the asynchronized neighboring cells simultaneously, the first DMTC information about the neighboring cells indicates the DMTC information about the synchronized neighboring cells and the asynchronized neighboring cells to the UE. As a result, it is able for the UE to in perform the channel measurement on the synchronized neighboring cells and the asynchronized neighboring cells simultaneously, thereby to ensure the service transmission.

The UE in the embodiments of the present disclosure may be a mobile telephone (or mobile phone), or any other device capable of transmitting or receiving a wireless signal, including a terminal, a Personal Digital Assistant (PDA), a wireless modem, a wireless communication device, a handheld device, a lap-top computer, a cordless telephone, a Wireless Local Loop (WLL) station, a Central Processing Element or a Mobile WIFI (MiFi) capable of converting a mobile signal into a WiFi signal, an intelligent household electrical appliance, or any other device capable of communicating with a mobile communication network voluntarily without being operated by a person.

It should be further appreciated that, the device and method may be implemented in any other ways. For example, the embodiments for the apparatus are merely for illustrative purposes, and the modules or units are provided merely on the basis of their logic functions. During the actual application, some modules or units may be combined together or integrated into another system. Alternatively, some functions of the module or units may be omitted or not executed. In addition, the coupling connection, direct coupling connection or communication connection between the modules or units may be implemented via interfaces, and the indirect coupling connection or communication connection between the modules or units may be implemented in an electrical or mechanical form or in any other form.

In addition, the functional units in the embodiments of the present disclosure may be integrated into a processing unit, or the functional units may exist independently, or two or more functional units may be combined together. The integrated functional units may be implemented in a hardware form or in a hardware plus software form.

In the case that the integrated functional units are implemented in a software form, they may be stored in a computer-readable medium, which may include a universal serial bus (USB) flash disk, a mobile hard disk (HD), a read-only memory (ROM), a random access memory (RAM), a magnetic disk or an optical disk and which may include several instructions so as to enable a computer equipment (a personal computer, a server or network equipment) to execute parts of the steps of the methods according to the embodiments of the present disclosure.

A1. An information configuration method, including steps of: determining whether or not it is necessary to transmit DMTC information about synchronized neighboring cells and DMTC information about asynchronized neighboring cells to a UE; and in the case that it is necessary to transmit the DMTC information about the synchronized neighboring cells and the DMTC information about the asynchronized neighboring cells to the UE, transmitting first DMTC information about the neighboring cells to the UE, the first DMTC information about the neighboring cells indicating the DMTC information about the synchronized neighboring cells and the DMTC information about the asynchronized neighboring cells to the UE, wherein the first DMTC information about the neighboring cells includes a first synchronization identifier and a first DMTC parameter, and the first DMTC parameter includes one or more of a duration of a DMTC window of the synchronized neighboring cells, a periodicity of the DMTC window of the synchronized neighboring cells, and a subframe offset of the synchronized neighboring cells.

A2. The information configuration method according to claim A1, wherein the first synchronization identifier indicates asynchronization.

A3. The information configuration method according to claim A1, wherein the first DMTC information about the neighboring cells further includes a second DMTC parameter, and the second DMTC parameter includes one or more of a duration of a DMTC window of the asynchronized neighboring cells, a periodicity of the DMTC window of the asynchronized neighboring cells, and a subframe offset of the DMTC window of the asynchronized neighboring cells.

A4. The information configuration method according to any one of claims A1 to A3, wherein the step of transmitting the first DMTC information about the neighboring cells to the UE includes: transmitting the first DMTC information about intra-frequency neighboring cells via a SIB3 broadcast message or a UE-specific RRC message; and/or transmitting the first DMTC information about inter-frequency neighboring cells at a designated frequency point via a SIB5 broadcast message or the UE-specific RRC message.

A5. The information configuration method according to claim A2 or A3, wherein the first DMTC information about the neighboring cells further includes first indication information, and the first indication information indicates the UE to use a periodicity of a DMTC window of a serving cell as the periodicity of the DMTC window of the synchronized neighboring cells, and/or use a duration of the DMTC window of the serving cell as the duration of the DMTC window of the synchronized neighboring cells.

A6. The information configuration method according to claim A2 or A3, wherein the first DMTC information about the neighboring cells further includes second indication information, and the second indication information indicates that the periodicity and/or the duration of the DMTC window of the synchronized neighboring cells are designated values.

A7. The information configuration method according to claim A1, wherein in the case that it is merely necessary to transmit the DMTC information about the synchronized neighboring cells to the UE, the information configuration method further includes transmitting second DMTC information about the neighboring cells to the UE, and the second DMTC information about the neighboring cells includes a second synchronization identifier indicating synchronization.

A8. The information configuration method according to claim A7, wherein the second DMTC information about the neighboring cells further includes third indication information, the third indication information indicates the UE to use a DMTC parameter of the serving cell as a DMTC parameter of the synchronized neighboring cells, or indicate that one or more of the duration of the DMTC window of the synchronized neighboring cells, the periodicity of the DMTC window of the synchronized neighboring cells and the subframe offset of the synchronized neighboring cells is a designated value, and the DMTC parameter of the serving cell includes the duration of the DMTC window of the serving cell, the periodicity of the DMTC window of the serving cell, and a subframe offset of the serving cell.

A9. The information configuration method according to claim A7, wherein the second DMTC information about the neighboring cells further includes a third DMTC parameter, and the third DMTC parameter at least includes the subframe offset of the DMTC window of the synchronized neighboring cells.

A10. The information configuration method according to claim A9, wherein the second DMTC information about the neighboring cells further includes fourth indication information, and the fourth indication information indicates the UE to use the duration of the DMTC window of the serving cell as the duration of the DMTC window of the synchronized neighboring cells and/or use the periodicity of the DMTC window of the serving cell as the periodicity of the DMTC window of the synchronized neighboring cells: or the second DMTC information about the neighboring cells further includes fifth indication information, and the fifth indication information indicates that one or two of the duration of the DMTC window of the synchronized neighboring cells and the periodicity of the DMTC window of the synchronized neighboring cells is a designated value.

A11. The information configuration method according to claim A1, wherein in the case that it is merely necessary to transmit the DMTC information about the asynchronized neighboring cells to the UE, the information configuration method further includes transmitting third DMTC information about the neighboring cells to the UE, and the third DMTC information about the neighboring cells includes a third synchronization identifier indicating asynchronization.

A12. The information configuration method according to claim A11, wherein the third DMTC information about the neighboring cells further includes a fourth DMTC parameter, and the fourth DMTC parameter includes one or more of the duration of the DMTC window of the asynchronized neighboring cells, the periodicity of the DMTC window of the asynchronized neighboring cells, and the subframe offset in of the DMTC window of the asynchronized neighboring cells.

B13. An information configuration method, including steps of: receiving first DMTC information about the neighboring cells from a base station, the first DMTC information about the neighboring cells indicating DMTC information about synchronized neighboring cells and DMTC information about asynchronized neighboring cells: acquiring the DMTC information about the synchronized neighboring cells and the DMTC information about the asynchronized neighboring cells in accordance with the first DMTC information about the neighboring cells; and performing channel measurement on the synchronized neighboring cells in accordance with the DMTC information about the synchronized neighboring cells, and performing channel measurement on the asynchronized neighboring cells in accordance with the DMTC information about the asynchronized neighboring cells, wherein the first DMTC information about the neighboring cells includes a first synchronization identifier and a first DMTC parameter, and the first DMTC parameter includes one or more of a duration of a DMTC window of the synchronized neighboring cells, a periodicity of the DMTC window of the synchronized neighboring cells, and a subframe offset of the synchronized neighboring cells.

B14. The information configuration method according to claim B13, wherein the step of receiving the first DMTC information about the neighboring cells from the base station includes: receiving the first DMTC information about intra-frequency neighboring cells via a SIB3 broadcast message or a UE-specific RRC message; and receiving the first DMTC information about inter-frequency neighboring cells at a designated frequency point via a SIB5 broadcast message or the UE-specific RRC message.

B15. The information configuration method according to claim B13, wherein the step of acquiring the DMTC information about the synchronized neighboring cells and the DMTC information about the asynchronized neighboring cells in accordance with the first DMTC information about the neighboring cells includes, in the case that the first synchronization identifier indicates asynchronization, acquiring the DMTC information about the synchronized neighboring cells and the in DMTC information about the asynchronized neighboring cells in accordance with the first DMTC information about the neighboring cells.

B16. The information configuration method according to claim B13, wherein the step of acquiring the DMTC information about the synchronized neighboring cells and the DMTC information about the asynchronized neighboring cells in accordance with the first DMTC information about the neighboring cells includes, in the case that the first DMTC parameter further includes a second DMTC parameter, acquiring the DMTC information about the synchronized neighboring cells and the DMTC information about the asynchronized neighboring cells in accordance with the first DMTC information about the neighboring cells, wherein the second DMTC parameter includes one or more of a duration of a DMTC window of the asynchronized neighboring cells, a periodicity of the DMTC window of the asynchronized neighboring cells, and a subframe offset of the DMTC window of the asynchronized neighboring cells.

B17. The information configuration method according to claim B15 or B16, wherein the step of acquiring the DMTC information about the synchronized neighboring cells in accordance with the first DMTC information about the neighboring cells includes determining a periodicity of a DMTC window of a serving cell as a periodicity of the DMTC window of the synchronized neighboring cells and/or a duration of the DMTC window of the serving cell as the duration of the DMTC window of the synchronized neighboring cells in accordance with first indication information included in the first DMTC information about the neighboring cells.

B18. The information configuration method according to claim B15 or B16, wherein the step of acquiring the DMTC information about the synchronized neighboring cells in accordance with the first DMTC information about the neighboring cells includes determining the periodicity and/or the duration of the DMTC window of the synchronized neighboring cells as designated values in accordance with second indication information included in the first DMTC information about the neighboring cells.

B19. The information configuration method according to claim B15 or B16, wherein the step of acquiring the DMTC information about the asynchronized neighboring cells in accordance with the first DMTC information about the neighboring cells includes: determining the periodicity of the DMTC window of the asynchronized neighboring cells as a designated periodicity or a sum of the designated periodicity and a designated offset; and/or determining the duration of the DMTC window of the asynchronized neighboring cells as a designated duration; and/or determining the subframe offset of the DMTC window of the asynchronized neighboring cells as a designated subframe offset.

B20. The information configuration method according to claim B16, wherein the step of acquiring the DMTC information about the asynchronized neighboring cells in accordance with the first DMTC information about the neighboring cells includes determining the periodicity of the DMTC window of the asynchronized neighboring cells as the periodicity of the DMTC window included in the second DMTC parameter, or a sum of the periodicity of the DMTC window included in the second DMTC parameter and a designated offset.

B21. The information configuration method according to claim B13, further including: receiving second DMTC information about the neighboring cells from the base station, the second DMTC information about the neighboring cells including a second synchronization identifier indicating synchronization; determining a DMTC parameter of the synchronized neighboring cells in accordance with the second DMTC information about the neighboring cells; and performing channel measurement on the synchronized neighboring cells in accordance with the DMTC parameter of the synchronized neighboring cells.

B22. The information configuration method according to claim B21, wherein the step of determining the DMTC parameter of the synchronized neighboring cells in accordance with the second DMTC information about the neighboring cells includes determining a DMTC parameter of the serving cell as the DMTC parameter of the synchronized neighboring cells in accordance with third indication information included in the second DMTC information about the neighboring cells, or determining one or more of the duration of the DMTC window of the synchronized neighboring cells, the periodicity of the DMTC window of the synchronized neighboring cells and the subframe offset of the synchronized neighboring cells as a designated value, wherein the DMTC parameter of the serving cell includes the duration of the DMTC window of the serving cell, the periodicity of the DMTC window of the serving cell, and a subframe offset of the DMTC window of the serving cell.

B23. The information configuration method according to claim B21, wherein the second DMTC information about the neighboring cells further includes a third DMTC parameter, and the third DMTC parameter at least includes the subframe offset of the DMTC window of the synchronized neighboring cells.

B24. The information configuration method according to claim B23, wherein the step of determining the DMTC parameter of the synchronized neighboring cells in accordance with the second DMTC information about the neighboring cells includes determining the duration of the DMTC window of the serving cell as the duration of the DMTC window of the synchronized neighboring cells and/or determining the periodicity of the DMTC window of the serving cell as the periodicity of the DMTC window of the synchronized neighboring cells in accordance with fourth indication information included in the second DMTC information about the neighboring cells.

B25. The information configuration method according to claim B23, wherein the step of determining the DMTC parameter of the synchronized neighboring cells in accordance with the second DMTC information about the neighboring cells includes determining one or two of the duration and the periodicity of the DMTC window of the synchronized neighboring cells as a designated value in accordance with fifth indication information included in the second DMTC information about the neighboring cells.

B26. The information configuration method according to claim B13, further including: receiving third DMTC information about the neighboring cells from in the base station, the third DMTC information about the neighboring cells including a third synchronization identifier indicating asynchronization; determining a DMTC parameter of the asynchronized neighboring cells in accordance with the third DMTC information about the neighboring cells; and performing channel measurement on the asynchronized neighboring cells in accordance with the DMTC parameter of the asynchronized neighboring cells.

B27. The information configuration method according to claim B26, wherein the third DMTC information about the neighboring cells further includes a fourth DMTC parameter, and the fourth DMTC parameter includes one or more of the duration of the DMTC window of the asynchronized neighboring cells, the periodicity of the DMTC window of the asynchronized neighboring cells, and the subframe offset of the DMTC window of the asynchronized neighboring cells.

B28. The information configuration method according to claim B26 or B27, wherein the step of determining the DMTC parameter of the asynchronized neighboring cells in accordance with the third DMTC information about the neighboring cells includes: determining the periodicity of the DMTC window of the asynchronized neighboring cells as a designated periodicity or a sum of the designated periodicity and a designated offset; and/or determining the duration of the DMTC window of the asynchronized neighboring cells as a designated duration: and/or determining the subframe offset of the DMTC window of the asynchronized neighboring cells as a designated subframe offset.

B29. The information configuration method according to claim B27, wherein the step of determining the DMTC parameter of the asynchronized neighboring cells in accordance with the third DMTC information about the neighboring cells includes determining the periodicity of the DMTC window of the asynchronized neighboring cells as the periodicity of the DMTC window included in the fourth DMTC parameter, or a sum of the periodicity of the DMTC window included in the fourth DMTC parameter and a designated offset.

C30. An information configuration device, including: a determination module configured to determine whether or not it is necessary to transmit DMTC in information about synchronized neighboring cells and DMTC information about asynchronized neighboring cells to a UE; and a first information transmission module configured to, in the case that it is necessary to transmit the DMTC information about the synchronized neighboring cells and the DMTC information about the asynchronized neighboring cells to the UE, transmit first DMTC information about the neighboring cells to the UE, the first DMTC information about the neighboring cells indicating the DMTC information about the synchronized neighboring cells and the DMTC information about the asynchronized neighboring cells to the UE, wherein the first DMTC information about the neighboring cells includes a first synchronization identifier and a first DMTC parameter, and the first DMTC parameter includes one or more of a duration of a DMTC window of the synchronized neighboring cells, a periodicity of the DMTC window of the synchronized neighboring cells, and a subframe offset of the synchronized neighboring cells.

C31. The information configuration device according to claim C30, wherein the first synchronization identifier indicates asynchronization.

C32. The information configuration device according to claim 30, wherein the first DMTC information about the neighboring cells further includes a second DMTC parameter, and the second DMTC parameter includes one or more of a duration of a DMTC window of the asynchronized neighboring cells, a periodicity of the DMTC window of the asynchronized neighboring cells, and a subframe offset of the DMTC window of the asynchronized neighboring cells.

C33. The information configuration device according to any one of claims C30 to C32, wherein the first information transmission module is further configured to transmit the first DMTC information about intra-frequency neighboring cells via a SIB3 broadcast message or a UE-specific RRC message, and transmit the first DMTC information about inter-frequency neighboring cells at a designated frequency point via a SIB5 broadcast message or the UE-specific RRC message.

C34. The information configuration device according to claim C31 or C32, wherein the first DMTC information about the neighboring cells further includes first indication information, and the first indication information indicates the UE to use a periodicity of a DMTC window of a serving cell as the periodicity of the DMTC window of the synchronized neighboring cells, and/or use a duration of the DMTC window of the serving cell as the duration of the DMTC window of the synchronized neighboring cells.

C35. The information configuration device according to claim C31 or C32, wherein the first DMTC information about the neighboring cells further includes second indication information, and the second indication information indicates that the periodicity and/or the duration of the DMTC window of the synchronized neighboring cells are designated values.

C36. The information configuration device according to claim C30, further including a second information transmission module configured to transmit second DMTC information about the neighboring cells to the UE, wherein the second DMTC information about the neighboring cells includes a second synchronization identifier indicating synchronization.

C37. The information configuration device according to claim C36, wherein the second DMTC information about the neighboring cells further includes third indication information, the third indication information indicates the UE to use a DMTC parameter of the serving cell as a DMTC parameter of the synchronized neighboring cells, or indicate that one or more of the duration of the DMTC window of the synchronized neighboring cells, the periodicity of the DMTC window of the synchronized neighboring cells and the subframe offset of the synchronized neighboring cells is a designated value, and the DMTC parameter of the serving cell includes the duration of the DMTC window of the serving cell, the periodicity of the DMTC window of the serving cell, and a subframe offset of the serving cell.

C38. The information configuration device according to claim C36, wherein the second DMTC information about the neighboring cells further includes a third DMTC parameter, and the third DMTC parameter at least includes the subframe offset of the DMTC window of the synchronized neighboring cells; the second DMTC information about the neighboring cells further includes fourth indication information, and the fourth indication information indicates the UE to use the duration of the DMTC window of the serving cell as the duration of the DMTC window of the synchronized neighboring cells and/or use the periodicity of the DMTC window of the serving cell as the periodicity of the DMTC window of the synchronized neighboring cells: or the second DMTC information about the neighboring cells further includes fifth indication information, and the fifth indication information indicates that one or two of the duration of the DMTC window of the synchronized neighboring cells and the periodicity of the DMTC window of the synchronized neighboring cells is a designated value.

C39. The information configuration device according to claim C30, further including a third information transmission module configured to transmit third DMTC information about the neighboring cells to the UE, wherein the third DMTC information about the neighboring cells includes a third synchronization identifier indicating asynchronization.

C40. The information configuration device according to claim C39, wherein the third DMTC information about the neighboring cells further includes a fourth DMTC parameter, and the fourth DMTC parameter includes one or more of the duration of the DMTC window of the asynchronized neighboring cells, the periodicity of the DMTC window of the asynchronized neighboring cells, and the subframe offset of the DMTC window of the asynchronized neighboring cells.

D41. An information configuration device, including: a first information reception module configured to receive first DMTC information about the neighboring cells from a base station, the first DMTC information about the neighboring cells indicating DMTC information about synchronized neighboring cells and DMTC information about asynchronized neighboring cells: an information acquisition module configured to acquire the DMTC information about the synchronized neighboring cells and the DMTC information about the asynchronized neighboring cells in accordance with the first DMTC information about the neighboring cells: and a channel measurement module configured to perform channel measurement on the synchronized neighboring cells in accordance with the DMTC information about the synchronized neighboring cells, and perform channel in measurement on the asynchronized neighboring cells in accordance with the DMTC information about the asynchronized neighboring cells, wherein the first DMTC information about the neighboring cells includes a first synchronization identifier and a first DMTC parameter, and the first DMTC parameter includes one or more of a duration of a DMTC window of the synchronized neighboring cells, a periodicity of the DMTC window of the synchronized neighboring cells, and a subframe offset of the synchronized neighboring cells.

D42. The information configuration device according to claim D41, wherein the first information reception module is further configured to receive the first DMTC information about intra-frequency neighboring cells via a SIB3 broadcast message or a UE-specific RRC message, and receive the first DMTC information about inter-frequency neighboring cells at a designated frequency point via a SIB5 broadcast message or the UE-specific RRC message.

D43. The information configuration device according to claim D41, wherein the information acquisition module is further configured to, in the case that the first synchronization identifier indicates asynchronization, acquire the DMTC information about the synchronized neighboring cells and the DMTC information about the asynchronized neighboring cells in accordance with the first DMTC information about the neighboring cells.

D44. The information configuration device according to claim D41, wherein the information acquisition module is further configured to, in the case that the first DMTC parameter further includes a second DMTC parameter, acquire the DMTC information about the synchronized neighboring cells and the DMTC information about the asynchronized neighboring cells in accordance with the first DMTC information about the neighboring cells, wherein the second DMTC parameter includes one or more of a duration of a DMTC window of the asynchronized neighboring cells, a periodicity of the DMTC window of the asynchronized neighboring cells, and a subframe offset of the DMTC window of the asynchronized neighboring cells.

D45. The information configuration device according to claim D43 or in D44, wherein in the case of acquiring the DMTC information about the synchronized neighboring cells, the information acquisition module is further configured to determine a periodicity of a DMTC window of a serving cell as a periodicity of the DMTC window of the synchronized neighboring cells and/or a duration of the DMTC window of the serving cell as the duration of the DMTC window of the synchronized neighboring cells in accordance with first indication information included in the first DMTC information about the neighboring cells.

D46. The information configuration device according to claim D43 or D44, wherein the information acquisition module is further configured, in the case of acquiring the DMTC information about the synchronized neighboring cells, determine the periodicity and/or the duration of the DMTC window of the synchronized neighboring cells as designated values in accordance with second indication information included in the first DMTC information about the neighboring cells.

D47. The information configuration device according to claim D43 or D44, wherein the information acquisition module is further configured to, in the case of acquiring the DMTC information about the asynchronized neighboring cells, determine the periodicity of the DMTC window of the asynchronized neighboring cells as a designated periodicity or a sum of the designated periodicity and a designated offset: and/or determine the duration of the DMTC window of the asynchronized neighboring cells as a designated duration: and/or determine the subframe offset of the DMTC window of the asynchronized neighboring cells as a designated subframe offset.

D48. The information configuration device according to claim D44, wherein the information acquisition module is further configured to, in the case of acquiring the DMTC information about the asynchronized neighboring cells, determine the periodicity of the DMTC window of the asynchronized neighboring cells as the periodicity of the DMTC window included in the second DMTC parameter, or a sum of the periodicity of the DMTC window included in the second DMTC parameter and a designated offset.

D49. The information configuration device according to claim D41, further including: a second information reception module configured to receive second DMTC information about the neighboring cells from the base station, the second DMTC information about the neighboring cells including a second synchronization identifier indicating synchronization; a first information determination module configured to determine a DMTC parameter of the synchronized neighboring cells in accordance with the second DMTC information about the neighboring cells, wherein the channel measurement module is further configured to perform channel measurement on the synchronized neighboring cells in accordance with the DMTC parameter of the synchronized neighboring cells.

D50. The information configuration device according to claim D49, wherein the first information determination module is further configured to determine a DMTC parameter of the serving cell as the DMTC parameter of the synchronized neighboring cells in accordance with third indication information included in the second DMTC information about the neighboring cells, or determine one or more of the duration of the DMTC window of the synchronized neighboring cells, the periodicity of the DMTC window of the synchronized neighboring cells and the subframe offset of the synchronized neighboring cells as a designated value, wherein the DMTC parameter of the serving cell includes the duration of the DMTC window of the serving cell, the periodicity of the DMTC window of the serving cell, and a subframe offset of the DMTC window of the serving cell.

D51. The information configuration device according to claim D49, wherein the second DMTC information about the neighboring cells further includes a third DMTC parameter, and the third DMTC parameter at least includes the subframe offset of the DMTC window of the synchronized neighboring cells.

D52. The information configuration device according to claim D51, wherein the first information determination module is further configured to determine the duration of the DMTC window of the serving cell as the duration of the DMTC window of the synchronized neighboring cells and/or determine the periodicity of the DMTC window of the serving cell as the periodicity of the DMTC window of the in synchronized neighboring cells in accordance with fourth indication information included in the second DMTC information about the neighboring cells.

D53. The information configuration device according to claim D51, wherein the first information determination module is further configured to determine one or two of the duration and the periodicity of the DMTC window of the synchronized neighboring cells as a designated value in accordance with fifth indication information included in the second DMTC information about the neighboring cells.

D54. The information configuration device according to claim D41, further including: a third information reception module configured to receive third DMTC information about the neighboring cells from the base station, the third DMTC information about the neighboring cells including a third synchronization identifier indicating asynchronization; and a second information determination module configured to determine a DMTC parameter of the asynchronized neighboring cells in accordance with the third DMTC information about the neighboring cells, wherein the channel measurement module is further configured to perform channel measurement on the asynchronized neighboring cells in accordance with the DMTC parameter of the asynchronized neighboring cells.

D55. The information configuration device according to claim D54, wherein the third DMTC information about the neighboring cells further includes a fourth DMTC parameter, and the fourth DMTC parameter includes one or more of the duration of the DMTC window of the asynchronized neighboring cells, the periodicity of the DMTC window of the asynchronized neighboring cells, and the subframe offset of the DMTC window of the asynchronized neighboring cells.

D56. The information configuration device according to claim D54 or D55, wherein the second information determination module is further configured to: determine the periodicity of the DMTC window of the asynchronized neighboring cells as a designated periodicity or a sum of the designated periodicity and a designated offset: and/or determine the duration of the DMTC window of the asynchronized neighboring cells as a designated duration; and/or determine the in subframe offset of the DMTC window of the asynchronized neighboring cells as a designated subframe offset.

D57. The information configuration device according to claim D56, wherein the second information determination module is further configured to determine the periodicity of the DMTC window of the asynchronized neighboring cells as the periodicity of the DMTC window included in the fourth DMTC parameter, or a sum of the periodicity of the DMTC window included in the fourth DMTC parameter and a designated offset.

E58. An information configuration device, including a processor, a memory and a transmitter, wherein the processor is configured to call and execute programs or data stored in the memory, so as to determine whether or not it is necessary to transmit DMTC information about synchronized neighboring cells and DMTC information about asynchronized neighboring cells to a UE: the transmitter is configured to, in the case that it is necessary to transmit the DMTC information about the synchronized neighboring cells and the DMTC information about the asynchronized neighboring cells to the UE, transmit first DMTC information about the neighboring cells to the UE, the first DMTC information about the neighboring cells indicating the DMTC information about the synchronized neighboring cells and the DMTC information about the asynchronized neighboring cells to the UE, wherein the first DMTC information about the neighboring cells includes a first synchronization identifier and a first DMTC parameter, and the first DMTC parameter includes one or more of a duration of a DMTC window of the synchronized neighboring cells, a periodicity of the DMTC window of the synchronized neighboring cells, and a subframe offset of the synchronized neighboring cells.

F59. An information configuration device, including a processor, a memory and a receiver, wherein the receiver is configured to receive first DMTC information about the neighboring cells from a base station, the first DMTC information about the neighboring cells indicating DMTC information about synchronized neighboring cells and DMTC information about asynchronized neighboring cells: the processor is configured to call and execute programs or data stored in the memory, so as to acquire the DMTC information about the synchronized neighboring cells and the DMTC information about the asynchronized neighboring cells in accordance with the first DMTC information about the neighboring cells received by the receiver, perform channel measurement on the synchronized neighboring cells in accordance with the DMTC information about the synchronized neighboring cells, and perform channel measurement on the asynchronized neighboring cells in accordance with the DMTC information about the asynchronized neighboring cells, wherein the first DMTC information about the neighboring cells includes a first synchronization identifier and a first DMTC parameter, and the first DMTC parameter includes one or more of a duration of a DMTC window of the synchronized neighboring cells, a periodicity of the DMTC window of the synchronized neighboring cells, and a subframe offset of the synchronized neighboring cells.

G60. A computer-readable storage medium storing thereon instructions so as to: determine whether or not it is necessary to transmit DMTC information about synchronized neighboring cells and DMTC information about asynchronized neighboring cells to a UE; and in the case that it is necessary to transmit the DMTC information about the synchronized neighboring cells and the DMTC information about the asynchronized neighboring cells to the UE, transmit first DMTC information about the neighboring cells to the UE, the first DMTC information about the neighboring cells indicating the DMTC information about the synchronized neighboring cells and the DMTC information about the asynchronized neighboring cells to the UE, wherein the first DMTC information about the neighboring cells includes a first synchronization identifier and a first DMTC parameter, and the first DMTC parameter includes one or more of a duration of a DMTC window of the synchronized neighboring cells, a periodicity of the DMTC window of the synchronized neighboring cells, and a subframe offset of the synchronized neighboring cells.

H61. A computer-readable storage medium storing thereon instructions so as to: receive first DMTC information about the neighboring cells from a base in station, the first DMTC information about the neighboring cells indicating DMTC information about synchronized neighboring cells and DMTC information about asynchronized neighboring cells; acquire the DMTC information about the synchronized neighboring cells and the DMTC information about the asynchronized neighboring cells in accordance with the first DMTC information about the neighboring cells: and perform channel measurement on the synchronized neighboring cells in accordance with the DMTC information about the synchronized neighboring cells, and perform channel measurement on the asynchronized neighboring cells in accordance with the DMTC information about the asynchronized neighboring cells, wherein the first DMTC information about the neighboring cells includes a first synchronization identifier and a first DMTC parameter, and the first DMTC parameter includes one or more of a duration of a DMTC window of the synchronized neighboring cells, a periodicity of the DMTC window of the synchronized neighboring cells, and a subframe offset of the synchronized neighboring cells.

The above are merely the preferred embodiments of the present disclosure, but the present disclosure is not limited thereto. Obviously, a person skilled in the art may make further modifications and improvements without departing from the spirit of the present disclosure, and these modifications and improvements shall also fall within the scope of the present disclosure.

What is claimed is:

1. An information configuration method, comprising steps of:
   determining whether or not it is necessary to transmit Discovery Signals Measurement Timing Configuration (DMTC) information about synchronized neighboring cells and DMTC information about asynchronized neighboring cells to a User Equipment (UE); and
   in the case that it is necessary to transmit the DMTC information about the synchronized neighboring cells and the DMTC information about the asynchronized neighboring cells to the UE, transmitting first DMTC information about the neighboring cells to the UE, the first DMTC information about the neighboring cells indicating the DMTC information about the synchronized neighboring cells and the DMTC information about the asynchronized neighboring cells to the UE,
   wherein the first DMTC information about the neighboring cells comprises a first synchronization identifier and a first DMTC parameter, and the first DMTC parameter comprises one or more of a duration of a DMTC window of the synchronized neighboring cells, a periodicity of the DMTC window of the synchronized neighboring cells, and a subframe offset of the synchronized neighboring cells.

2. The information configuration method according to claim 1, wherein the first DMTC information about the neighboring cells further comprises a second DMTC parameter, and the second DMTC parameter comprises one or more of a duration of a DMTC window of the asynchronized neighboring cells, a periodicity of the DMTC window of the asynchronized neighboring cells, and a subframe offset of the DMTC window of the asynchronized neighboring cells.

3. The information configuration method according to claim 1, wherein the step of transmitting the first DMTC information about the neighboring cells to the UE comprises: transmitting the first DMTC information about intra-frequency neighboring cells via a System Information Block3 (SIB3) broadcast message or a UE-specific Radio Resource Control (RRC) message; and/or transmitting the first DMTC information about inter-frequency neighboring cells at a designated frequency point via a SIB5 broadcast message or the UE-specific RRC message.

4. The information configuration method according to claim 1, wherein in the case that it is merely necessary to transmit the DMTC information about the synchronized neighboring cells to the UE, the information configuration method further comprises transmitting second DMTC information about the neighboring cells to the UE, and the second DMTC information about the neighboring cells comprises a second synchronization identifier indicating synchronization, wherein the second DMTC information about the neighboring cells further comprises a third DMTC parameter, and the third DMTC parameter at least comprises the subframe offset of the DMTC window of the synchronized neighboring cells.

5. The information configuration method according to claim 1, wherein in the case that it is merely necessary to transmit the DMTC information about the asynchronized neighboring cells to the UE, the information configuration method further comprises transmitting third DMTC information about the neighboring cells to the UE, and the third DMTC information about the neighboring cells comprises a third synchronization identifier indicating asynchronization.

6. The information configuration method according to claim 5, wherein the third DMTC information about the neighboring cells further comprises a fourth DMTC parameter, and the fourth DMTC parameter comprises one or more of the duration of the DMTC window of the asynchronized neighboring cells, the periodicity of the DMTC window of the asynchronized neighboring cells, and the subframe offset of the DMTC window of the asynchronized neighboring cells.

7. An information configuration method, comprising steps of:
   receiving first Discovery Signals Measurement Timing Configuration (DMTC) information about a neighboring cells from a base station, the first DMTC information about the neighboring cells indicating DMTC information about synchronized neighboring cells and DMTC information about asynchronized neighboring cells;
   acquiring the DMTC information about the synchronized neighboring cells and the DMTC information about the asynchronized neighboring cells in accordance with the first DMTC information about the neighboring cells; and
   performing channel measurement on the synchronized neighboring cells in accordance with the DMTC information about the synchronized neighboring cells, and performing channel measurement on the asynchronized neighboring cells in accordance with the DMTC information about the asynchronized neighboring cells,
   wherein the first DMTC information about the neighboring cells comprises a first synchronization identifier and a first DMTC parameter, and the first DMTC parameter comprises one or more of a duration of a DMTC window of the synchronized neighboring cells, a periodicity of the DMTC window of the synchronized neighboring cells, and a subframe offset of the synchronized neighboring cells.

8. The information configuration method according to claim 7, wherein the step of receiving the first DMTC information about the neighboring cells from the base station comprises: receiving the first DMTC information about intra-frequency neighboring cells via a System Information Block3 (SIB3) broadcast message or a User Equipment (UE)-specific Radio Resource Control (RRC) message; and receiving the first DMTC information about inter-frequency neighboring cells at a designated frequency point via a SIB5 broadcast message or the UE-specific RRC message.

9. The information configuration method according to claim 7, wherein the step of acquiring the DMTC information about the synchronized neighboring cells and the DMTC information about the asynchronized neighboring cells in accordance with the first DMTC information about the neighboring cells comprises:

in the case that the first DMTC parameter further comprises a second DMTC parameter, acquiring the DMTC information about the synchronized neighboring cells and the DMTC information about the asynchronized neighboring cells in accordance with the first DMTC information about the neighboring cells, wherein the second DMTC parameter comprises one or more of a duration of a DMTC window of the asynchronized neighboring cells, a periodicity of the DMTC window of the asynchronized neighboring cells, and a subframe offset of the DMTC window of the asynchronized neighboring cells.

10. The information configuration method according to claim 7, wherein the step of acquiring the DMTC information about the asynchronized neighboring cells in accordance with the first DMTC information about the neighboring cells comprises:

determining the periodicity of the DMTC window of the asynchronized neighboring cells as a designated periodicity or a sum of the designated periodicity and a designated offset; and/or determining the duration of the DMTC window of the asynchronized neighboring cells as a designated duration; and/or determining the subframe offset of the DMTC window of the asynchronized neighboring cells as a designated subframe offset.

11. The information configuration method according to claim 9, wherein the step of acquiring the DMTC information about the asynchronized neighboring cells in accordance with the first DMTC information about the neighboring cells comprises:

determining the periodicity of the DMTC window of the asynchronized neighboring cells as the periodicity of the DMTC window comprised in the second DMTC parameter, or a sum of the periodicity of the DMTC window comprised in the second DMTC parameter and a designated offset.

12. The information configuration method according to claim 7, further comprising:

receiving second DMTC information about the neighboring cells from the base station, the second DMTC information about the neighboring cells comprising a second synchronization identifier indicating synchronization;

determining a DMTC parameter of the synchronized neighboring cells in accordance with the second DMTC information about the neighboring cells; and performing channel measurement on the synchronized neighboring cells in accordance with the DMTC parameter of the synchronized neighboring cells, wherein the second DMTC information about the neighboring cells further comprises a third DMTC parameter, and the third DMTC parameter at least comprises the subframe offset of the DMTC window of the synchronized neighboring cells.

13. The information configuration method according to claim 7, further comprising:

receiving third DMTC information about the neighboring cells from the base station, the third DMTC information about the neighboring cells comprising a third synchronization identifier indicating asynchronization;

determining a DMTC parameter of the asynchronized neighboring cells in accordance with the third DMTC information about the neighboring cells; and performing channel measurement on the asynchronized neighboring cells in accordance with the DMTC parameter of the asynchronized neighboring cells.

14. The information configuration method according to claim 13, wherein the third DMTC information about the neighboring cells further comprises a fourth DMTC parameter, and the fourth DMTC parameter comprises one or more of the duration of the DMTC window of the asynchronized neighboring cells, the periodicity of the DMTC window of the asynchronized neighboring cells, and the subframe offset of the DMTC window of the asynchronized neighboring cells.

15. The information configuration method according to claim 13, wherein the step of determining the DMTC parameter of the asynchronized neighboring cells in accordance with the third DMTC information about the neighboring cells comprises: determining the periodicity of the DMTC window of the asynchronized neighboring cells as a designated periodicity or a sum of the designated periodicity and a designated offset; and/or determining the duration of the DMTC window of the asynchronized neighboring cells as a designated duration; and/or determining the subframe offset of the DMTC window of the asynchronized neighboring cells as a designated subframe offset.

16. The information configuration method according to claim 14, wherein the step of determining the DMTC parameter of the asynchronized neighboring cells in accordance with the third DMTC information about the neighboring cells comprises:

determining the periodicity of the DMTC window of the asynchronized neighboring cells as the periodicity of the DMTC window comprised in the fourth DMTC parameter, or a sum of the periodicity of the DMTC window comprised in the fourth DMTC parameter and a designated offset.

17. An information configuration device, comprising a processor, a, memory and a transmitter, wherein the processor is configured to call and execute programs or data stored in the memory, so as to determine whether or not it is necessary to transmit Discovery Signals Measurement Timing Configuration (DMTC) information about synchronized neighboring cells and DMTC information about asynchronized neighboring cells to a User Equipment (UE); the transmitter is configured to, in the case that it is necessary to transmit the DMTC information about the synchronized neighboring cells and the DMTC information about the asynchronized neighboring cells to the UE, transmit first DMTC information about the neighboring cells to the UE, the first DMTC information about the neighboring cells indicating the DMTC information about the synchronized neighboring cells and the DMTC information about the asynchronized neighboring cells to the UE, wherein the first DMTC information about the neighboring cells comprises a first synchronization identifier and a first DMTC parameter, and the first DMTC parameter comprises one or more of a duration of a DMTC window of the synchronized neighboring cells, a periodicity of the DMTC window of the synchronized neighboring cells, and a subframe offset of the synchronized neighboring cells.

18. An information configuration device, comprising a processor, a memory and a receiver, wherein the receiver is configured to receive first Discovery Signals Measurement Timing Configuration (DMTC) information about a neighboring cells from a base station, the first DMTC information about the neighboring cells indicating DMTC information about synchronized neighboring cells and DMTC information about asynchronized neighboring cells; the processor is configured to call and execute programs or data stored in the memory, so as to acquire the DMTC information about the synchronized neighboring cells and the DMTC information about the asynchronized neighboring cells in accordance with the first DMTC information about the neighboring cells received by the receiver, perform channel measurement on the synchronized neighboring cells in accordance with the DMTC information about the synchronized neighboring cells, and perform channel measurement on the asynchronized neighboring cells in accordance with the DMTC information about the asynchronized neighboring cells, wherein the first DMTC information about the neighboring cells comprises a first synchronization identifier and a first DMTC parameter, and the first DMTC parameter comprises one or more of a duration of a DMTC window of the synchronized neighboring cells, a periodicity of the DMTC window of the synchronized neighboring cells, and a subframe offset of the synchronized neighboring cells.

* * * * *